(12) United States Patent
Xie et al.

(10) Patent No.: US 9,326,302 B2
(45) Date of Patent: Apr. 26, 2016

(54) METHOD AND SYSTEM FOR IMPLEMENTING REVERSE SINGLE RADIO VOICE CALL CONTINUITY

(75) Inventors: Zhenhua Xie, Shenzhen (CN); Quanjun Tao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 482 days.

(21) Appl. No.: 13/642,888

(22) PCT Filed: Jul. 2, 2010

(86) PCT No.: PCT/CN2010/074907
§ 371 (c)(1),
(2), (4) Date: Nov. 19, 2012

(87) PCT Pub. No.: WO2011/130949
PCT Pub. Date: Oct. 27, 2011

(65) Prior Publication Data
US 2013/0250909 A1   Sep. 26, 2013

(30) Foreign Application Priority Data

Apr. 23, 2010   (CN) .......................... 2010 1 0157038

(51) Int. Cl.
*H04W 76/02* (2009.01)
*H04W 36/00* (2009.01)
(Continued)

(52) U.S. Cl.
CPC .............. *H04W 76/02* (2013.01); *H04L 65/103* (2013.01); *H04L 65/104* (2013.01);
(Continued)

(58) Field of Classification Search
None
See application file for complete search history.

(56) References Cited

U.S. PATENT DOCUMENTS

2003/0165124 A1*   9/2003   Alperovich et al. .......... 370/331
2009/0245180 A1    10/2009  Wu
(Continued)

FOREIGN PATENT DOCUMENTS

| CN | 101106803 A | 1/2008 |
| CN | 101273652 A | 9/2008 |

(Continued)

OTHER PUBLICATIONS

3rd Generation Partnership Project, Technical Specification Group Services and System Aspects; Feasibility Study of Single Radio Voice Call Continuity (SRVCC) from UTRAN/GERAN to E-UTRAN/HSPA; Stage 2 (Release 10), TR 23.885 V0.2.0 (Mar. 30, 2010).*

(Continued)

*Primary Examiner* — Thai Nguyen
(74) *Attorney, Agent, or Firm* — Ling Wu; Stephen Yang; Ling and Yang Intellectual Property

(57) ABSTRACT

A method and system for implementing reverse Single Radio Voice Call Continuity (rSRVCC) are provided in the present invention. The method includes: after receiving a handover request from a Circuit Switch (CS) domain, a current Mobile Switch Center (MSC) sending a transfer request regarding a terminal subscriber or a session in which the terminal subscriber participates to an IP Multimedia Core Network Subsystem (IMS) Control Function Entity (ICFE); and after receiving the transfer request, the ICFE initiating a media connection establishment flow between the terminal and a far end. The technical solution of the present invention ensures rSRVCC when a terminal hands over from a CS domain to a PS domain.

17 Claims, 12 Drawing Sheets

(51) Int. Cl.
  *H04L 29/06* (2006.01)
  *H04W 36/14* (2009.01)
  *H04W 80/10* (2009.01)
(52) U.S. Cl.
  CPC ....... *H04L 65/1016* (2013.01); *H04L 65/1083* (2013.01); *H04W 36/0022* (2013.01); *H04W 36/14* (2013.01); *H04W 80/10* (2013.01)

(56) References Cited

U.S. PATENT DOCUMENTS

2011/0164564 A1* 7/2011 Vedrine et al. .............. 370/328
2011/0200011 A1* 8/2011 Rune ............... H04W 36/0022
                                                      370/331

FOREIGN PATENT DOCUMENTS

| CN | 101351039 A | 1/2009 |
|----|-------------|--------|
| WO | 2010005180 A2 | 1/2010 |
| WO | 2010020417 A2 | 2/2010 |
| WO | 2010020417 A3 | 2/2010 |

OTHER PUBLICATIONS

3rd Generation Partnership Project, Technical Specification Group Services and System Aspects; IP Multimedia Subsystem (IMS) Service Continuity; Stage 2 (Release 10), TR 23.237 V0.1.0 (Mar. 2010).*

3rd Generation Partnership Project, Technical Specification Group Services and System Aspects; IP Multimedia Subsystem (IMS) centralized services; Stage 2 (Release 10), TR 23.292 V10.0.0 (Mar. 2010).*

"Optimizing Alternative D-1 for LTE/CS voice call continuity"; Motorola, Approval, 8.7, SAE/REL-8; 3GPP TSG SA WG2 Architecture-S2#60, Oct. 8-12, 2007; Kobe, Japan; S2-074162; XP50260998A; see pp. 1-12.

"new alternative for rSRVCC-IMS procedure initiated by MSC Server"; ZTE, Approval, 8.6.4, FS_rSRVCC/R10; 3GPP TSG SA WG2 Meeting#79, May 10-14, 2010; Kyoto, Japan; TD S2-102730; XP50434913A; see pp. 1-4.

International Search Report for PCT/CN2010/074907 dated Jan. 5, 2011.

* cited by examiner

METHOD AND SYSTEM FOR IMPLEMENTING REVERSE SINGLE RADIO VOICE CALL CONTINUITY

TECHNICAL FIELD

The present invention relates to the field of communication, and in particular, to a method and system for implementing reverse Single Radio Voice Call Continuity (rSRVCC) in an IP (Internet Protocol) Multimedia Core Network Subsystem.

BACKGROUND ART

IP Multimedia Core Network Subsystem (IMS) is an IP-based network architecture proposed by the 3rd Generation Partnership Project (3GPP), and it constructs an open and flexible service environment, supports multimedia application, and can provide plentiful multimedia services for the subscribers.

In an IMS service system, the control layer is separated from the service layer. The control layer does not provide specific services, and only provides necessary functions such as trigger, routing and charging for the service layer.

The service triggering and control function in the control layer is implemented by a Call Session Control Function (CSCF). The CSCF is divided into three types: Proxy-CSCF (P-CSCF), Interrogating-CSCF (I-CSCF), and Serving-CSCF (S-CSCF), wherein, the S-CSCF takes the main responsibilities, and the I-CSCF is optional.

The service layer is composed of a series of Application Servers (ASs), and can provide specific services. The AS may be an independent entity, or may be present in the S-CSCF.

The control layer (S-CSCF) controls service triggering according to the subscription information of the subscriber, revokes the services on the AS, and implements the service functions.

The end-to-end equipment in a session is called a User Equipment (UE), which is responsible for interaction with the user. Some UE has multiple modes for accessing the network, including accessing the network through a 3GPP Packet Switch (PS) domain, through other non-3GPP PS domains, or even through a Circuit Switch (CS) domain, etc. The IMS network also has an Interconnect Border Control Function (IBCF), which is used for interaction between IMS networks of different operators.

If the CS network is configured with an enhanced Mobile Switch Center (eMSC), and an SIP (Session Initiation Protocol) interface is provided by the eMSC for the interaction with the IMS network, then the interaction between the IMS network and the CS network can be implemented by the eMSC.

For the UE with multiple access modes, if the UE can only use one of the modes at a certain moment and it is implementing a call service under the access mode of 2/3G network, since the call service is provided by the CS domain in the 2/3G network, when the UE moves to other places and thus needs to change the used access mode to accessing through a LTE (Long Term Evolution) network or HSPA (High Speed Packet Access) network, the UE and the network can provide a certain mode to ensure that the call service being implemented by the UE is not interrupted. Since the call service is provided by the PS domain in these networks, such an ability is called as reverse Single Radio Voice Call terminal Continuity, which is in short reverse Single Radio Voice Call Continuity—rSRVCC. Correspondingly, if the UE moves from a LTE network or HSPA network to a 2/3G network, it is forward Single Radio Voice Call terminal Continuity, which is in short Single Radio Voice Call Continuity.

There should be two processes for implementing the rSRVCC: one is a handover process from the original network to the destination network, and the other is a media connection establishment process between the terminal and the far end. Currently, the handover process already has a clear implementation flow (see FIG. 1) in the industry, but a clear solution for how to initiate the media connection establishment process between the terminal and the far end is still to be proposed.

FIG. 1 is the existing flowchart for rSRVCC, which describes that a call is established between UE-1 and UE-2, and UE-1 establishes the call through the CS domain of a 2/3G network, so what is connected with UE-1 in the call media path is a segment of CS media connection, and after UE-1 performs rSRVCC, the process of UE-1 handing over from the CS domain to the PS domain includes the following steps:

in step 101, UE-1 sends a measurement report to the original network serving the UE-1 to report the cell signal strength measurement information;

in step 102, the base station system of the original network serving the UE-1 judges according to the signal strength measurement information of each cell in the measurement report that a near PS destination network is mostly suitable for serving UE-1, and then decides to perform a handover operation, and the base station system of the original network sends a handover request, for example a Handover required message, to the MSC;

in step 103, the MSC sends a handover request, for example a CS to PS Handover Request message, to a destination network control entity, and the control entity may be a Mobility Management Entity (MME) of the LTE network or a Serving GPRS Support Node (SGSN) of the HSPA network;

in step 104, if the UE-1 also has data services, the base station system of the original network will also send a handover request, for example a Relocation Required message, to the data domain control entity (i.e., SGSN) of the original network;

in step 105, after step 104, the data domain control entity of the original network sends a handover request, for example a Forward Relocation Request message, to a destination network control entity;

in step 106, the destination network control entity sends a handover request, for example, a Handover Request message, to the bases station system of the destination network;

in step 107, the base station system of the destination network returns a handover response message, for example sending a Handover Request Acknowledge message;

in step 108, after receiving the handover response, the destination network control entity sends a handover response message, for example a CS to PS Handover Response message, to the MSC;

in step 109, the MSC sends a handover command, for example, a Handover Command message, to the base station system of the original network;

in step 110, if the UE-1 also has data services, the destination network control entity will also send a handover response, for example a Forward Relocation Response message, to a control entity of the data domain of the original network;

in step 111, after step 110, the original network data domain control entity sends a handover command, for example a Relocation Command message, to the base station system of the original network;

in step 112, the base station system of the original network sends a handover command, for example a HO from UTRAN/GERAN message, to the UE-1;

in step 113, the UE-1 executes handover, and hands over to the destination network, and then sends an attachment request, for example an Attach Request message, to the destination network control entity;

in step 114, the destination network control entity sends an attachment agreement message, for example an Attach Accept message, to the UE-1.

SUMMARY OF THE INVENTION

The technical problem to be solved in the present invention is to provide a method and system for implementing reverse Single Radio Voice Call Continuity (rSRVCC) so as to achieve reverse single radio voice call continuity when a terminal hands over from a CS domain to a PS domain.

In order to solve the above technical problem, the present invention provides a method for implementing reverse Single Radio Voice Call Continuity (rSRVCC), comprising the following steps of:

after receiving a handover request from a Circuit Switch (CS) domain, a current Mobile Switch Center (MSC) sending a transfer request regarding a terminal subscriber or a session in which the terminal subscriber participates to a Control Function Entity (ICFE) of an IP Multimedia Core Network Subsystem (IMS); and after receiving the transfer request, the ICFE initiating a media connection establishment flow between the terminal and a far end.

In order to solve the above technical problem, the present invention further provides another method for implementing reverse Single Radio Voice Call Continuity (rSRVCC), comprising the following steps of:

after receiving a handover request from a Circuit Switch (CS) domain, a current Mobile Switch Center (MSC) sending a first transfer request to a Control Function Entity (ICFE) of an IP Multimedia Core Network Subsystem (IMS);

after accessing a destination network, a terminal sending a second transfer request, the second transfer request targeting the ICFE or passing the ICFE; and, after receiving the second transfer request, the ICFE sending a transfer response to the terminal.

In order to solve the above technical problem, the present invention further provides a system for implementing reverse Single Radio Voice Call Continuity (rSRVCC), comprising a Mobile Switch Center (MSC) and a Control Function Entity (ICFE) of an IP Multimedia Core Network Subsystem (IMS), wherein:

the MSC comprises a transfer request module, and when the MSC is a current MSC, the transfer request module is configured to send to the ICFE a transfer request regarding a terminal subscriber or a session in which the terminal subscriber participates;

the ICFE comprises a connection establishment control module, which is configured to receive the transfer request, and initiate a media connection establishment flow between the terminal and the far end after receiving the transfer request.

In order to solve the above technical problem, the present invention further provides a system for implementing reverse Single Radio Voice Call Continuity (rSRVCC), comprising a Mobile Switch Center (MSC), a terminal and a Control Function Entity (ICFE) of an IP Multimedia Core Network Subsystem (IMS), wherein:

the MSC is configured to, when the MSC is a current MSC, send a first transfer request to the ICFE after receiving a handover request from a Circuit Switch (CS) domain;

the terminal is configured to, after accessing a destination network, send a second transfer request; the second transfer request targets the ICFE or passes the ICFE;

the ICFE is configured to send a transfer response to the terminal after receiving the second transfer request.

By using the method and system for implementing rSRVCC provided in the present invention, with the aid of the current MSC of the network, the media connection establishment flow between the terminal and the far end is initiated by the IMS control function entity (ICFE) or by the terminal such that the reverse Single Radio Voice Call Continuity is ensured when the terminal hands over from the CS domain to the PS domain.

PREFERRED EMBODIMENTS OF THE PRESENT INVENTION

The core concept of the method and system for implementing rSRVCC according to the present invention is that with the aid of the current MSC of the network, the media connection establishment flow between the terminal and the far end is initiated by the IMS control function entity (ICFE) or by the terminal such that the reverse Single Radio Voice Call Continuity is ensured when the terminal hands over from the CS domain to the PS domain. Wherein, the ICFE may be present in the control function entity of an IMS network such as P-CSCF, IBCF or SC AS.

The current MSC in the present invention refers to the MSC participating in the transfer process, and if the MSC does not change during the handover process, the MSC is the current MSC described in the present invention; if the MSC needs to hand over from the original MSC to the destination MSC during the handover process, the destination MSC is the current MSC described in the present invention.

Figure 12:
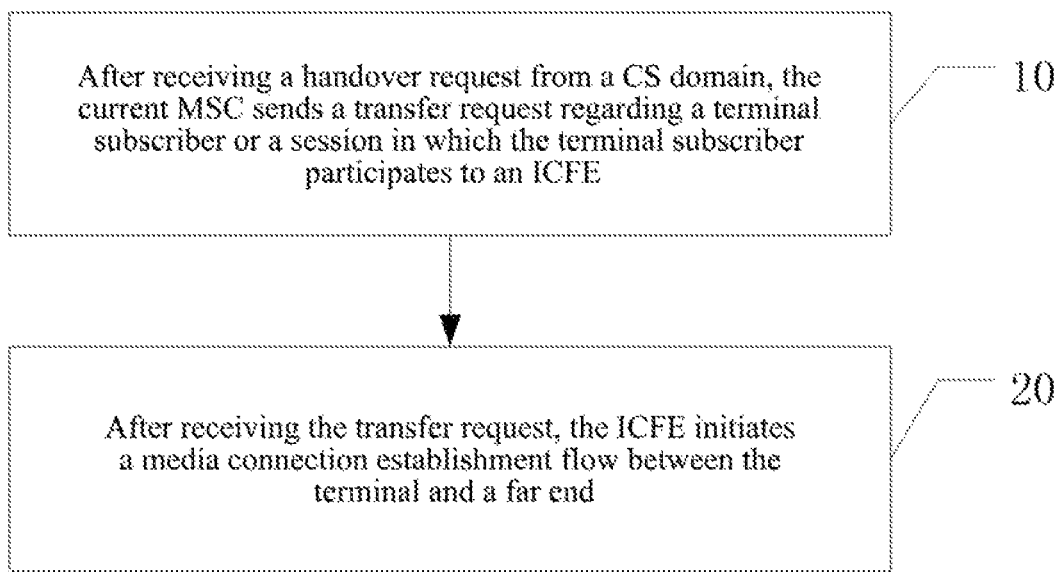
FIG. 12 illustrates the flow of the method for implementing rSRVCC according to the present invention.

As shown in FIG. 12, the method for implementing rSRVCC according to the present invention comprises the following steps:

Step 10, transfer request step: after receiving a handover request from a CS domain, the current Mobile Switch Center (MSC) sends a transfer request regarding a terminal subscriber or a session in which the terminal subscriber participates to a Control Function Entity (ICFE) of an IMS;

Step 20, connection establishment step: after receiving the transfer request, the ICFE initiates a media connection establishment flow between the terminal and a far end.

The specific flows are described in the following examples one to seven.

See the following examples one, two, three and five when signaling anchors the current MSC. The method for the ICFE initiating a media connection establishment flow between the terminal and a far end after receiving the transfer request includes:

the ICFE sending a connection establishment message to the terminal through the current MSC after receiving the transfer request.

See the following examples one, two and five when media anchors the current MSC:

The transfer request in the transfer request step carries transfer request association information;

the connection establishment step comprises: the ICFE sending to the terminal the connection establishment message through the MSC, wherein the connection establishment message carries the transfer request association information, and the connection establishment message forwarded by the current MSC to the terminal carries media resource information of the current MSC;

the current MSC establishing a media connection with the terminal after receiving the message of the terminal carrying the media resource information;

the current MSC associating the media connection between the current MSC and the terminal with the media connection between the current MSC and the far end according to the transfer request association information.

See the following examples one, two and five when media anchors the current MSC. In the transfer request step, the transfer request sent by the current MSC carries the media resource information of the current MSC; in the connection establishment step, the ICFE uses the media resource information carried in the transfer request to directly update the far end, or firstly judges whether it needs to update the far end, and updates the far end if so.

In the connection establishment step, the ICFE judges whether it needs to update the far end according to the information of the initiating party of the transfer request.

See the following example three when signaling anchors the current MSC but media does not. In the connection establishment step, the ICFE requests the far end to transmit media resource information after receiving the transfer request, and after receiving the message of the far end carrying the media resource information, the ICFE sends out the media resource information in the message through a connection establishment message.

See the following examples one to three when signaling anchors the current MSC. One way for ensuring success of the establishment of the media connection is that: in the connection establishment step, the current MSC forwards the connection establishment message again after receiving a message sent by the terminal for rejecting the connection establishment message, or no response message of the connection establishment message is received when time is out.

See the following example five when signaling anchors the current MSC. Another way for ensuring success of the establishment of the media connection is that: in the connection establishment step, the current MSC forwards the connection establishment message to the terminal after receiving a handover completion notification sent by the destination network control entity.

The destination network control entity transmits a handover completion notification in any one of the following cases:

after receiving a handover request from the CS domain, the current MSC sends a handover notification to the destination network control entity, and the destination network control entity sends a handover completion notification to the current MSC after sensing that the terminal accesses the destination network; or, after completing handover, the terminal sends a handover completion indication to the destination network control entity, and the destination network control entity sends a handover completion notification to the current MSC after receiving the indication.

See the following examples four, six and seven, when signaling does not anchor the current MSC. In the connection establishment step, the method for the ICFE initiating a media connection establishment flow between the terminal and the far end after receiving the transfer request is:

the ICFE sending a connection establishment message to the terminal after receiving the transfer request.

See the following example six when media anchors a media gateway controlled by the ICFE. In the connection establishment step, the ICFE sends out the media resource information of the media gateway controlled by the ICFE through the connection establishment message after receiving the transfer request.

See the following example seven when media anchors a media gateway controlled by the ICFE. In the connection establishment step, the ICFE updates the far end using the media resource information of the media gateway controlled by the ICFE after receiving the transfer request.

See the following example four when media does not anchor a media gateway controlled by the ICFE. In the connection establishment step, the ICFE requests the far end to transmit media resource information after receiving the transfer request, and after receiving the message of the far end carrying the media resource information, the ICFE sends out the media resource information in the message through the connection establishment message.

In order to ensure success of the media connection establishment, see examples four, six and seven, in the connection establishment step, the ICFE forwards the connection establishment message again after receiving a message sent by the terminal for rejecting the connection establishment message, or no response message of the connection establishment message is received when time is out.

The present invention will be described in detail with reference to the drawings and examples.

After receiving a handover request from the CS domain, the MSC of the present invention may or may not send the handover request to the destination network control entity.

EXAMPLE ONE

Figure 1:
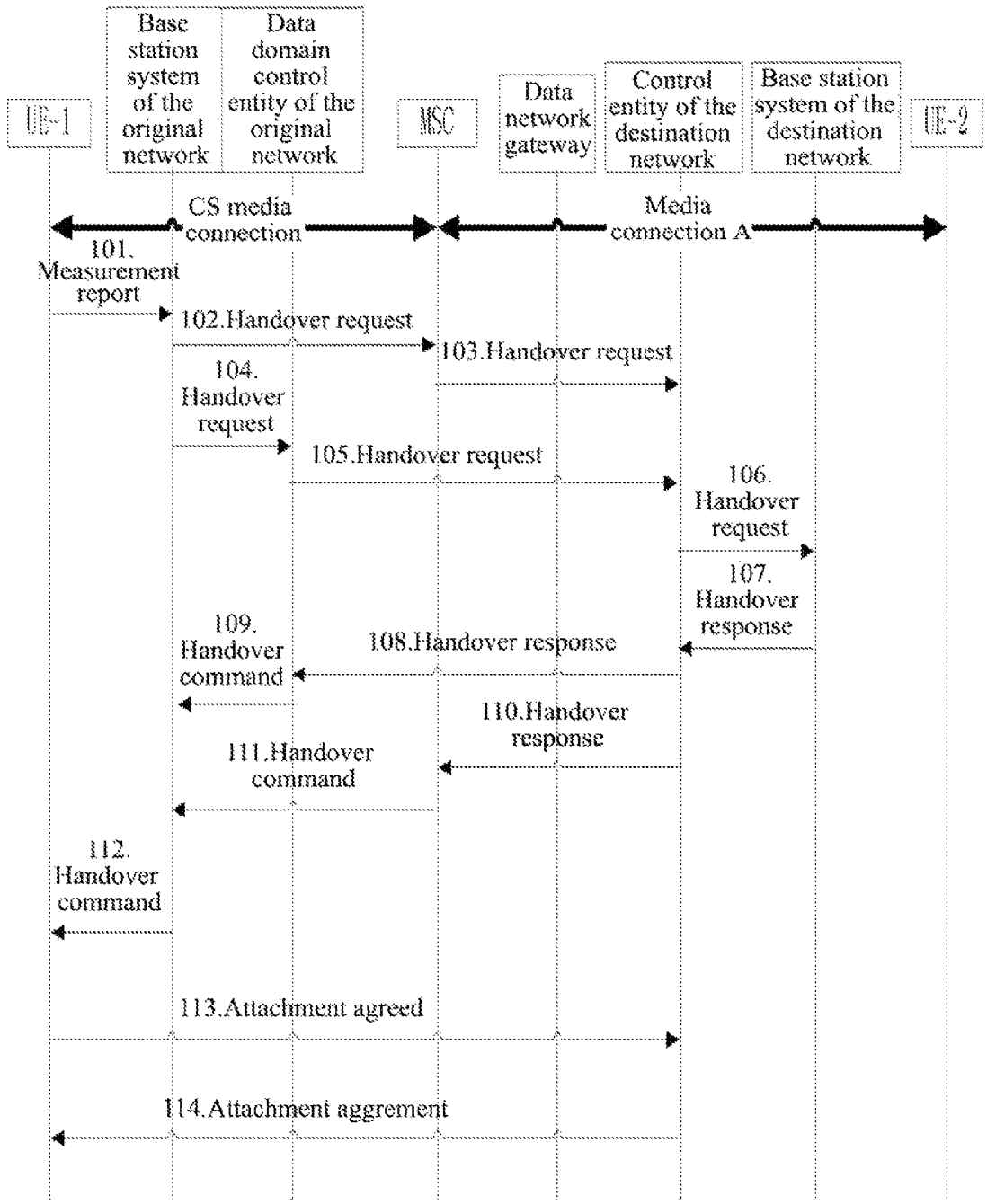
FIG. 1 is a flowchart of the existing method for implementing rSRVCC.
Figure 2:
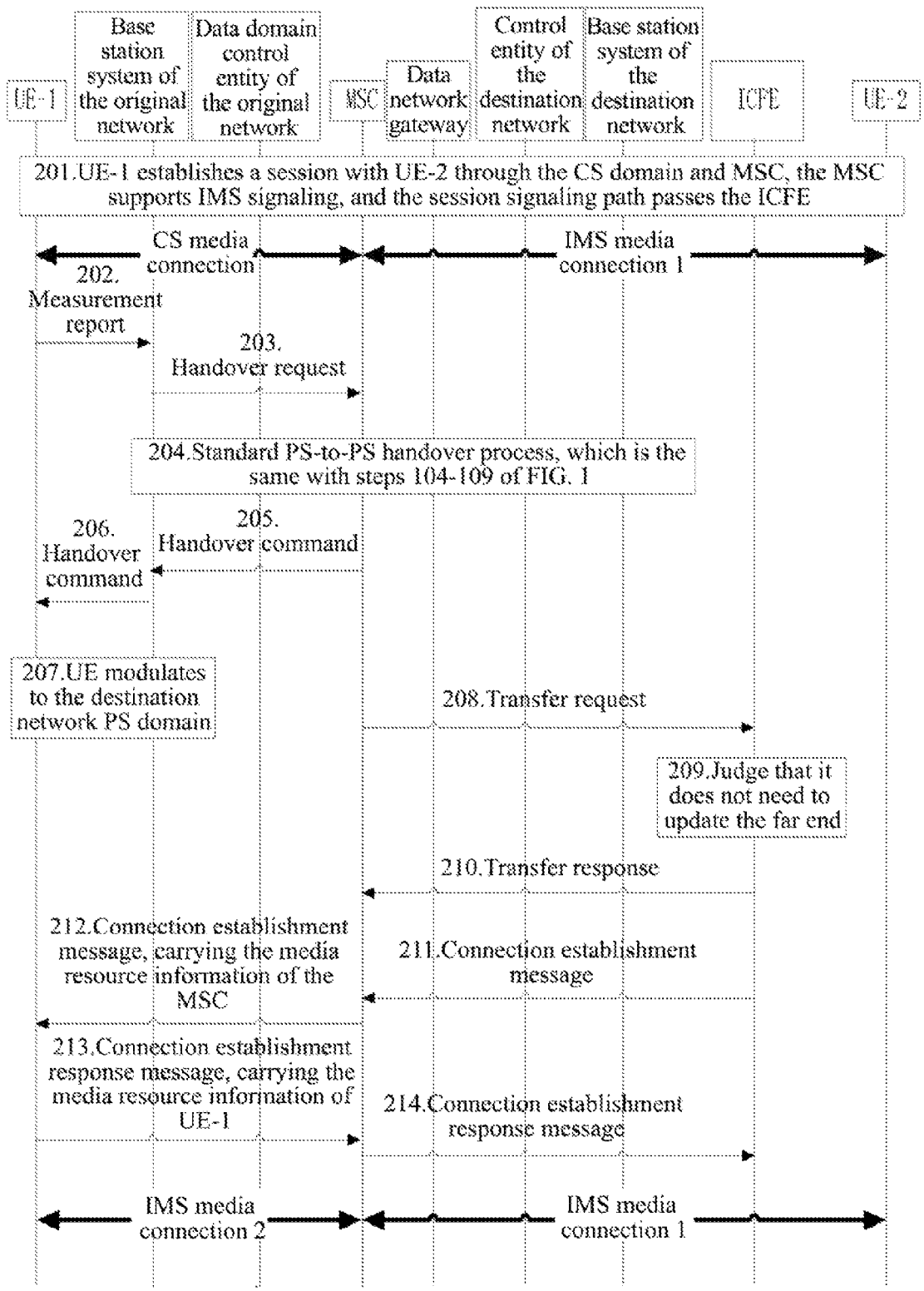
FIG. 2 is a flowchart of Example One of the method for implementing rSRVCC according to the present invention.

FIG. 2 is a flowchart of Example One of the method for implementing rSRVCC according to the present invention, which describes that a call is established between UE-1 and UE-2, and UE-1 establishes the call through the CS domain of a 2/3G network, so what is connected with UE-1 in the call media path is a segment of CS media connection, and when UE-1 moves and it needs to change the access mode of the UE-1 to the PS domain of LTE or HSPA, a media connection is established for the subsequent call through the media anchor of the destination MSC, and under the condition when the destination MSC is precisely the original MSC, the process of the UE-1 implementing rSRVCC comprises the following steps:

in step 201, UE-1 establishes a session with UE-2 through the CS domain and MSC, the MSC supports IMS signaling, and the session signaling path passes the ICFE (may be present in P-CSCF, IBCF or SC AS);

steps 202-203 are the same with steps 101-102 in FIG. 1;

in step 204, if the UE-1 also has services in the PS domain of the original network, a standard PS-to-PS handover flow is performed, and the process is the same as in steps 104-109 of FIG. 1;

in step 205, after step 203, the MSC sends a handover command to the CS domain immediately after receiving the handover request from the CS domain, and the message reaches the base station system of the original network.

It should be pointed out that whether the MSC sends the handover request to the destination network control entity or not is not taken into consideration in the present invention.

In step 206, the base station system of the original network sends a handover command to the UE-1 to request the UE-1 to hand over to the destination network;

in step 207, the UE-1 modulates to access the destination network after receiving the handover command;

in step 208, after step 203, the MSC receives the handover request from the CS domain, and initiates a transfer request to the ICFE, or if the ICFE is not an SC AS, initiates a transfer request to the SC AS and requests that the transfer request passes the ICFE (for example adding the identifier of the ICFE to the Route header field of the transfer request) (the identifier of the ICFE may be pre-configured in the MSC).

The transfer request may have various implementation modes, for example, an INVITE (invite) message or REFER (reference) message is initiated with the number of the SC AS or ICFE being the target, or an INVITE message or REFER message is initiated with the identifier of the SC AS or ICFE being the target, or a REFER message is transmitted on the original session path.

The transfer request carries handover terminal subscriber association information, MSC association information and/or transfer request association information, wherein the handover terminal subscriber association information may be the subscriber identifier information or number information of the UE-1, and can be deduced from the International Mobile Subscriber Identity (IMSI) in the received handover request, and the ICFE can determine the corresponding terminal subscriber and the session to be transferred according to the handover terminal subscriber association information.

The transfer request may also be a reINVITE (reinvite) message, and the session association information in the reINVITE message per se may be used as the handover terminal subscriber association information (since the information of the two parties participating in the session can be found through the session association information), so the handover terminal subscriber association information does not need to be specially carried when a reINVITE message is used as a transfer request.

MSC association information and transfer request association information may be represented by a parameter respectively, or may be represented by a combined parameter, for example, they are represented in a form of subscriber name @ host name, wherein, the subscriber name part can be used for transfer request association, and the host name part can be used for MSC association. The MSC association information is used for the ICFE routing the connection establishment message to the MSC in the subsequent step 211, and the transfer request association information is used for the MSC associating the connection establishment message with the transfer request of this step in the subsequent step 211.

The number and/or identifier of the ICFE may be pre-configured in the MSC.

In step 209, after receiving the transfer request, the ICFE judges that it does not need to update the far end, for example, the media resource information in the INVITE message does not change as compared with that in the original session, or a REFER message on the original session path is received, so the far end is not updated;

in step 210, the ICFE responds to the transfer request, for example by sending a "200 OK" message, and a transfer response message finally reaches the MSC;

in step 211, after step 208, the ICFE finds out the terminal subscriber identifier of the UE-1 according to the handover terminal subscriber association information, and sends a connection establishment message to the UE-1 through the PS domain using the terminal identifier;

the connection establishment message can be implemented through sending an INVITE message, the ICFE requests that the connection establishment message passes the MSC, for example routing information, which includes MSC association information, is configured in the header field of the call message, and if the MSC association information cannot be used for transfer request association, the ICFE also carries the transfer request association information obtained in step 208 in the connection establishment message;

In step 212, the connection establishment message reaches the MSC, and the MSC associates the transfer request in step 208 according to the transfer request association information, forwards the connection establishment message to the UE-1, and carries the media resource information of the MSC in the forwarded connection establishment message;

if the UE-1 has not finished the operation of accessing the destination network at this moment, the forwarded connection establishment message may be rejected. The operation of forwarding the connection establishment message is performed again after the MSC receives a message for rejecting the forwarded connection establishment message or no response message of the connection establishment message is received when time is out, until the connection establishment message is accepted.

In step 213, the UE-1 receives the connection establishment message, and responds to the connection establishment message, for example by sending a "200 OK" message, which carries the media resource information of the UE-1;

In step 214, the connection establishment message passes the MSC, and the MSC completes media negotiation with the UE-1 according to the media resource information in the message, and forwards the connection establishment message to the ICFE;

by now, IMS media connection 2 is established between the UE-1 and MSC, and the MSC connects the newly established IMS media connection 2 with the IMS media connection 1 of the original session so that the UE-1 can continue to talk with the UE-2.

EXAMPLE TWO

Figure 3:
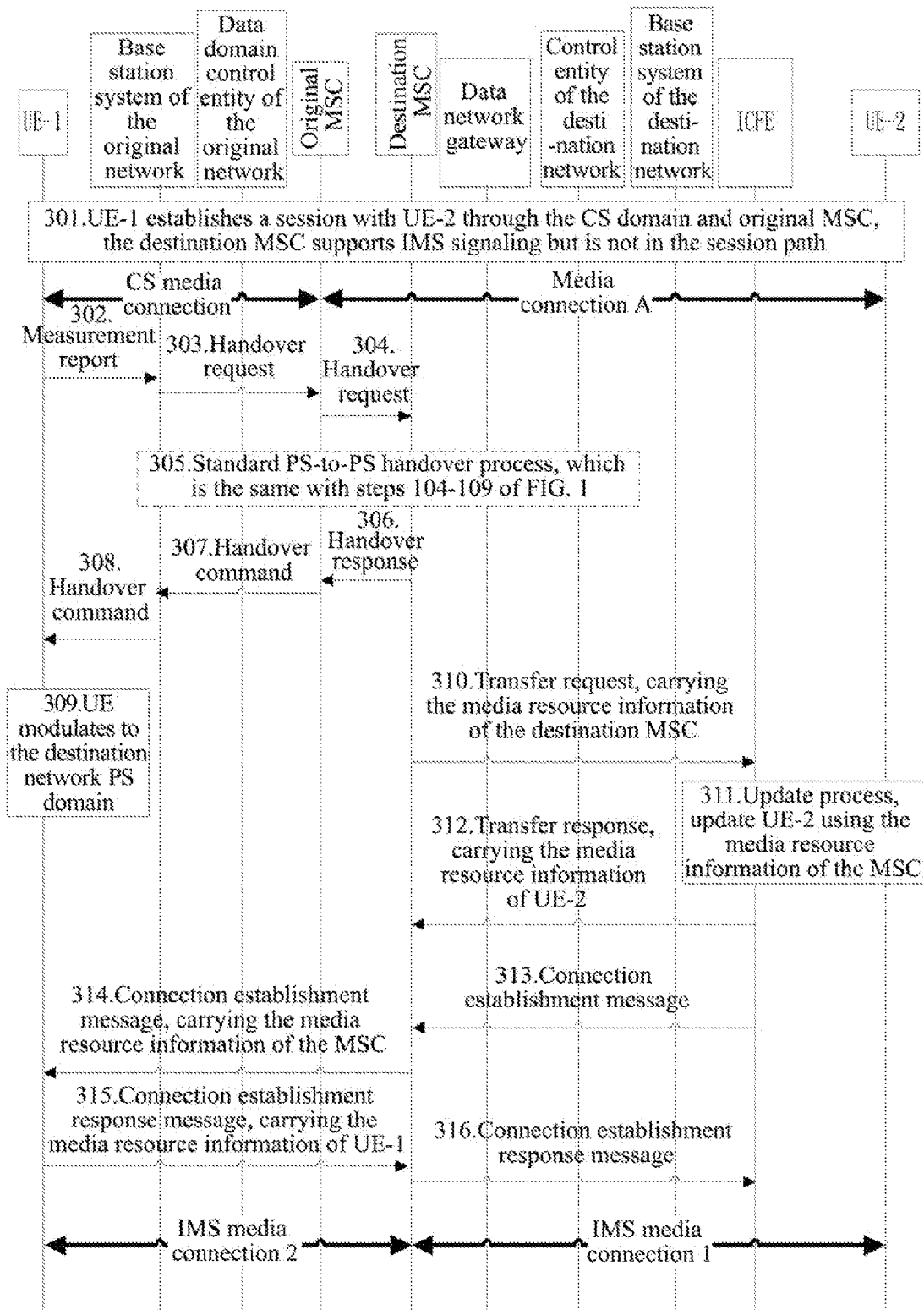
FIG. 3 is a flowchart of Example Two of the method for implementing rSRVCC according to the present invention.

FIG. 3 is a flowchart of Example Two of the method for implementing rSRVCC according to the present invention, which describes that a call is established between UE-1 and UE-2, and UE-1 establishes the call through the CS domain of a 2/3G network, so what is connected with UE-1 in the call media path is a segment of CS media connection, and when UE-1 moves and it needs to change the access mode of the UE-1 to the PS domain of LTE or HSPA, a media connection is established for the subsequent call through the media anchor of the destination MSC, and when the destination MSC is not the original MSC, the process of the UE-1 implementing rSRVCC comprises the following steps:

in step 301, UE-1 establishes a session with UE-2 through the CS domain and original MSC, the destination MSC supports IMS signaling but is not in the signaling path, and the session signaling path passes the SC AS;

steps 302-303 are the same with steps 101-102 in FIG. 1;

in step 304, after receiving a handover request, the original MSC initiates a standard inter-office handover process of the CS domain to the destination MSC, and the original MSC sends the handover request to the destination MSC;

in step 305, if the UE-1 also has services in the PS domain of the original network, a standard PS-to-PS handover flow is performed, and the process is the same as in steps 104-109 of FIG. 1;

in step 306, after step 304, the destination MSC sends a handover response to the original MSC of the CS domain immediately after receiving the handover request from the CS domain, and the message reaches the original MSC;

in step 307, the original MSC sends a handover command to the base station system of the original network after receiving the handover response;

in step 308, the base station system of the original network sends the handover command to the UE-1 to request the UE-1 to hand over to the destination network;

in step 309, the UE-1 modulates to access the destination network after receiving the handover command;

in step 310, after step 304, the destination MSC receives the handover request from the CS domain, and initiates a transfer request to the ICFE, or if the ICFE is not an SC AS, initiates a transfer request to the SC AS and requests that the transfer request passes by the ICFE (for example adding the identifier of the ICFE to the Route header field of the transfer request) (the identifier of the ICFE may be pre-configured in the MSC);

the transfer request may have various implementation modes, for example, an INVITE (invite) message is initiated with the number of the SC AS or ICFE being the target, or an INVITE message is initiated with the identifier of the SC AS or ICFE being the target, the message carrying the media resource information of the destination MSC.

The transfer request carries handover terminal subscriber association information, MSC association information and/or transfer request association information, wherein the handover terminal subscriber association information may be the subscriber identifier information of number information of the UE-1, and can be deduced from the International Mobile Subscriber Identity (IMSI) in the received handover request, and the ICFE can determine the corresponding terminal subscriber and the session to be transferred according to the handover terminal subscriber association information.

MSC association information and session association information may be represented by a parameter respectively, or may be represented by a combined parameter, for example, they are represented in a form of subscriber name @ host name, wherein, the subscriber name part can be used for transfer request association, and the host name part can be used for MSC association.

The number and/or identifier of the ICFE may be pre-configured in the MSC.

In step 311, after receiving the transfer request, the ICFE judges that it needs to initiate a flow of updating the far end, and sends an update request to the UE-2, for example if the ICFE is a P-CSCF or IBCF, it sends a transfer request, for example an INVITE message, to the SC AS (the identifier of the SC AS may be pre-configured in the ICFE), and then the SC AS sends a reINVITE message to the far end; if the ICFE is an SC AS, it sends a reINVITE message, the update request carries the media resource information obtained in step 310 and reaches the UE-2 via the CSCF;

understandably, the media resource information of the destination MSC in the transfer request sent by the destination MSC may be modified or updated by other network elements on the signaling path during the process of being transmitted to the ICFE, thereby leading to the result that the media resource information in the transfer request received by the ICFE is no longer the original media resource information, but the media resource information is still media resource information associated with the destination MSC.

There is a similar case for the media resource information in other examples, i.e., the media resource information of the transmitting end may be different from that of the receiving end, but the object to which it substantially points does not change.

The UE-2 receives the update request, responds to the update request, for example by sending a "200 OK" message carrying the media resource information of the UE-2, and the message reaches the ICFE via the CSCF;

in step 312, the ICFE responds to the transfer request, for example by sending a "200 OK" message carrying the media resource information of the UE-2, and the transfer response finally reaches the MSC;

in step 313, after step 310, the ICFE finds out the terminal subscriber identifier of the UE-1 according to the handover terminal subscriber association information, and sends a connection establishment message to the UE-1 through the PS domain using the terminal identifier;

the connection establishment message can be implemented through sending an INVITE message, the ICFE requests that the connection establishment message passes by the destination MSC, for example routing information, which includes the identification information of the destination MSC, is configured in the header field of the call message, and if the identification information cannot be used as transfer request association, the ICFE also carries the transfer request association information obtained in step 310 in the connection establishment message;

in step 314, the connection establishment message reaches the destination MSC, and the destination MSC associates the transfer request in step 310 according to the transfer request association information, forwards the connection establishment message to the UE-1, the forwarded connection establishment message carrying the media resource information of the destination MSC;

if the UE-1 has not finished the operation of accessing the destination network at this moment, the forwarded connection establishment message may be rejected. The operation of forwarding the connection establishment message is performed again after the destination MSC receives a message for rejecting the forwarded connection establishment message or no response message of the connection establishment message is received when time is out, until the connection establishment message is accepted.

In step 315, the UE-1 receives the connection establishment message, and responds to the connection establishment message, for example by sending a "200 OK" message, which carries the media resource information of the UE-1;

In step 316, the connection establishment response message passes by the MSC, and the MSC completes media negotiation with the UE-1 according to the media resource information in the message, and forwards the connection establishment response message to the ICFE;

by now, IMS media connection 2 is established between the UE-1 and destination MSC, IMS media connection 1 is established between the destination MSC and UE-2, the MSC connects the newly established IMS media connection 2 with the newly established IMS media connection 1 so that the UE-1 can continue to talk with the UE-2.

In this example, if the original MSC and the destination MSC are the same MSC, the corresponding flow is substantially the same with that shown in FIG. 2, except the addition of the far end updating flow in step 311.

EXAMPLE THREE

Figure 4:
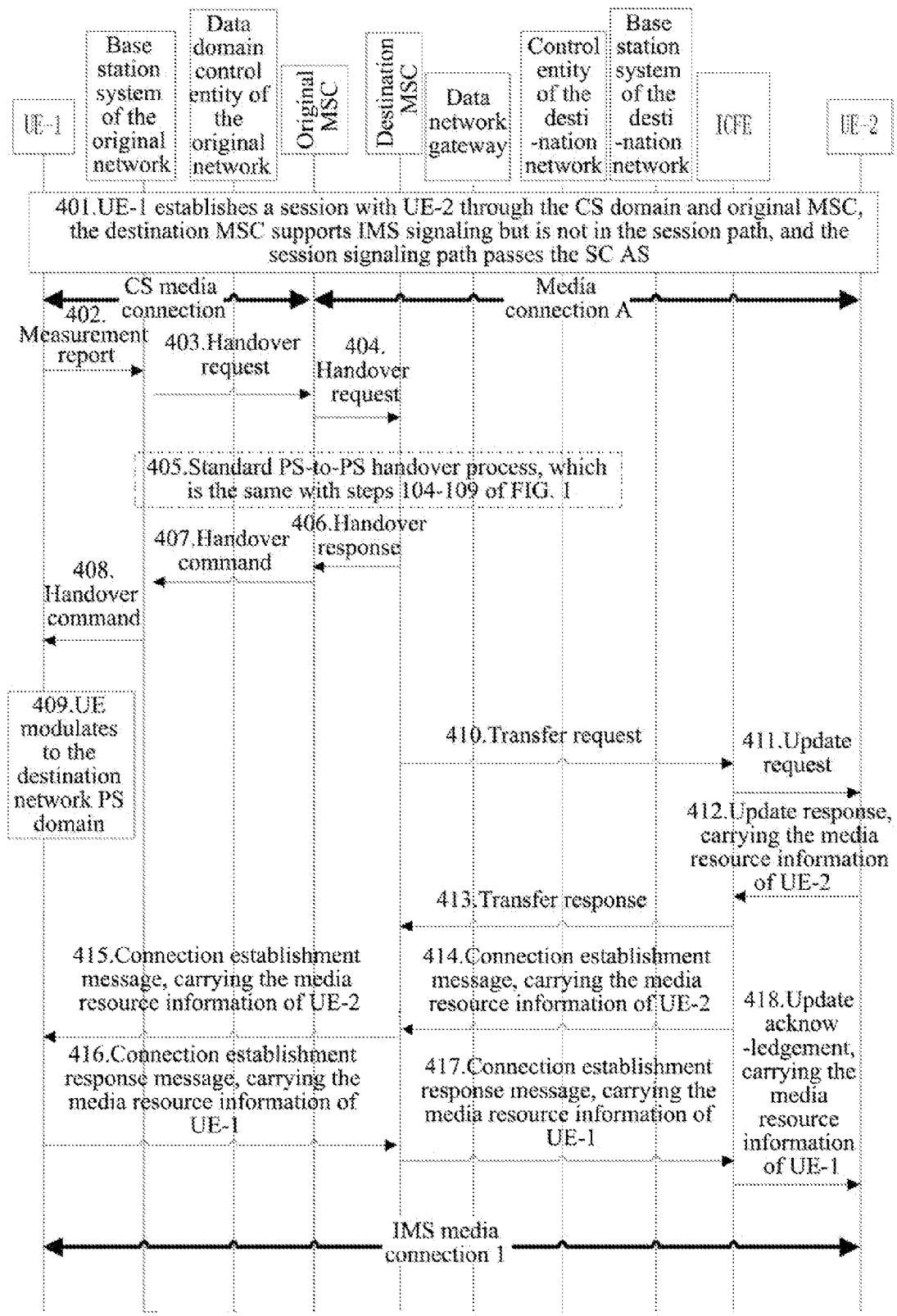
FIG. 4 is a flowchart of Example Three of the method for implementing rSRVCC according to the present invention.

FIG. 4 is a flowchart of Example Three of the method for implementing rSRVCC according to the present invention, which describes that a call is established between UE-1 and UE-2, and UE-1 establishes the call through the CS domain of a 2/3G network, so what is connected with UE-1 in the call media path is a segment of CS media connection, and when UE-1 moves and it needs to change the access mode of the UE-1 to the PS domain of LTE or HSPA, a media connection is established for the subsequent call through the signaling anchor, rather than media anchor, of the destination MSC, and the destination MSC is not the original MSC, the process of the UE-1 implementing rSRVCC by interacting with the ICFE through the MSC comprises the following steps:

Steps 401-409 are the same with steps 301-309 in FIG. 3;

In step 410, after step 404, the destination MSC receives the handover request from the CS domain, and initiates an IMS transfer request to the ICFE, or if the ICFE is not an SC AS, initiates a transfer request to the SC AS and requests that the transfer request pass by the ICFE (for example adding the identifier of the ICFE to the Route header field of the transfer request) (the identifier of the ICFE may be pre-configured in the MSC);

the transfer request may have various implementation modes, for example, an INVITE message or REFER message is initiated with the number of the SC AS or ICFE being the target, or an INVITE message or REFER message is initiated with the identifier of the SC AS or ICFE being the target.

The transfer request carries handover terminal subscriber association information, MSC association information and/or transfer request association information, wherein the handover terminal subscriber association information may be the subscriber identifier information of number information of the UE-1, and can be deduced from the International Mobile Subscriber Identity (IMSI) in the received handover request, and the ICFE can determine the corresponding terminal subscriber and the session to be transferred according to the handover terminal subscriber association information.

MSC association information and transfer request association information may be represented by a parameter respectively, or may be represented by a combined parameter, for example, they are represented in a form of subscriber name @ host name, wherein, the subscriber name part can be used for transfer r request association, and the host name part can be used for MSC association.

The number and/or identifier of the ICFE may be pre-configured in the MSC.

In step 411, after receiving the transfer request, the ICFE sends an update request to the UE-2, for example if the ICFE is a P-CSCF or IBCF, it sends a transfer request, for example an INVITE message, to the SC AS (the identifier of the SC AS may be pre-configured in the ICFE), and then the SC AS sends a reINVITE message to the far end; if the ICFE is an SC AS, it sends a reINVITE message. Compared with Example Two, the message does not carry the media resource information of the destination MSC, and the message reaches the UE-2 via the CSCF;

in step 412, the UE-2 receives the update request, responds to the update request, for example by sending a "200 OK" message carrying the media resource information of the UE-2, and the message reaches the ICFE via the CSCF;

in step 413, in the mean time of step 411, the ICFE responds to the transfer request, for example by sending a "200 OK" message, and the transfer response finally reaches the MSC;

in step 414, after step 412, the ICFE receives an update response message, and finds out the terminal subscriber identifier of the UE-1 according to the handover terminal subscriber association information, and sends a connection establishment message to the UE-1 through the PS domain using the terminal identifier, for example by sending an INVITE message, carrying the media resource information of the UE-2 obtained in step 412, the ICFE requests that the connection establishment message pass the destination MSC, for example routing information, which includes the association information of the destination MSC, is configured in the header field of the call message, and if the MSC association information cannot be used as transfer request association, the ICFE also carries the transfer request association information obtained in step 410 in the connection establishment message;

in step 415, the connection establishment message reaches the destination MSC, and the destination MSC associates the transfer request in step 410 according to the transfer request association information, forwards the connection establishment message to the UE-1, the message carrying the media resource information of the UE2;

if the UE-1 has not finished the operation of accessing the destination network at this moment, the forwarded connection establishment message may be rejected. The operation of forwarding the connection establishment message is performed again after the destination MSC receives a message for rejecting the forwarded connection establishment message or no response message of the connection establishment message is received when time is out, until the connection establishment message is accepted.

In step 416, the UE-1 receives the connection establishment message, and responds to the connection establishment message, for example by sending a "200 OK" message, which carries the media resource information of the UE-1;

In step 417, the connection establishment message reaches the ICFE via the MSC and CSCF, wherein the message carries the media resource information of the UE-1;

In step 418, after receiving a connection establishment response message, the ICFE sends an update acknowledgement message, for example an ACK message, to the UE-2, wherein the message carries the media resource information obtained in step 417 and finally reaches UE-2 via the CSCF;

by now, IMS media connection 1 is established between the UE-1 and UE-2 such that the UE-1 can continue to talk with the UE-2.

In this example, if the original MSC and the destination MSC are the same MSC, in step 401, the destination MSC will also be in the signaling path of the original session, and there is no step 404 or 406, and if a REFER message is used as the transfer request in step 410, the message may be a REFER message transmitted along the original session path.

EXAMPLE FOUR

Figure 5:
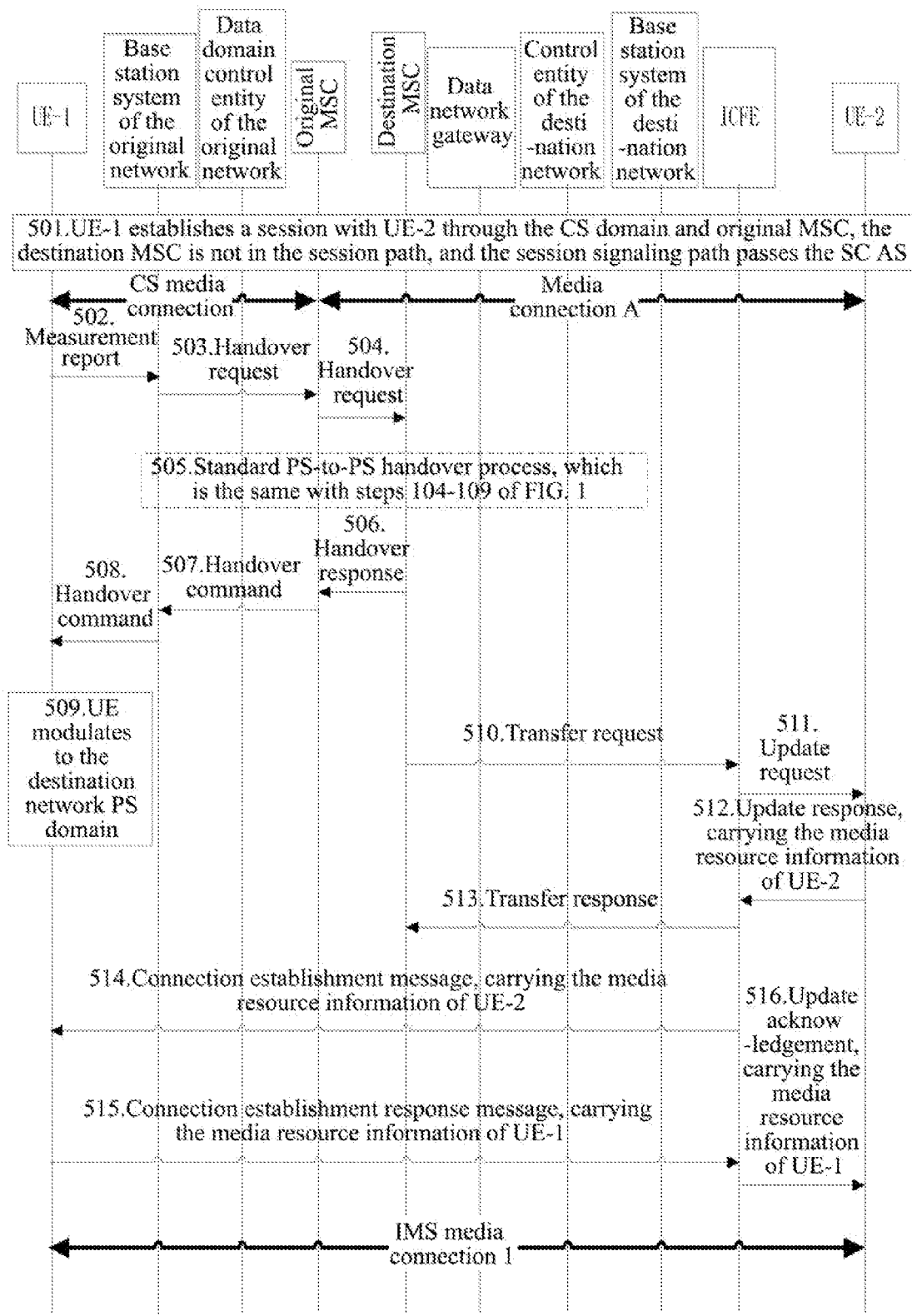
FIG. 5 is a flowchart of Example Four of the method for implementing rSRVCC according to the present invention.

FIG. 5 is a flowchart of Example Four of the method for implementing rSRVCC according to the present invention, which describes that a call is established between UE-1 and UE-2, and UE-1 establishes the call through the CS domain access, so what is connected with UE-1 in the call media path is a segment of CS media connection, and when UE-1 moves and it needs to change the access mode of the UE-1 to the PS domain of LTE or HSPA, the destination MSC is not in the signaling path of the subsequent session, and the destination MSC is not the original MSC, the process of the UE-1 implementing rSRVCC by directly interacting with the ICFE comprises the following steps:

In step 501, UE-1 establishes a session with UE-2 through the CS domain and original MSC, the destination MSC is not in the signaling path, and the session signaling path passes the SC AS;

Steps 502-509 are the same with steps 402-409 in FIG. 4;

In step 510, after step 504, the destination MSC receives the handover request from the CS domain, and initiates a transfer request to the ICFE, or if the ICFE is not an SC AS, initiates a transfer request to the SC AS and requests that the transfer request passes by the ICFE (for example adding the identifier of the ICFE to the Route header field of the transfer request) (the identifier of the ICFE may be pre-configured in the MSC);

the transfer request may have various implementation modes, for example, an INVITE (invite) message or REFER (reference) message or IAM (initial address message) is initiated with the number of the SC AS or ICFE being the target, or an INVITE message or REFER message is initiated with the identifier of the SC AS or ICFE being the target.

The transfer request carries handover terminal subscriber association information, the handover terminal subscriber association information may be the subscriber identifier information of number information of the UE-1, and can be deduced from the International Mobile Subscriber Identity (IMSI) in the received handover request, and the ICFE can determine the corresponding terminal according to the handover terminal subscriber association information.

The number and/or identifier of the ICFE may be pre-configured in the MSC.

In step 511, after receiving the transfer request, the ICFE sends an update request to the UE-2, for example if the ICFE is a P-CSCF or IBCF, it sends a transfer request, for example an INVITE message, to the SC AS (the identifier of the SC AS may be pre-configured in the ICFE), and then the SC AS sends a reINVITE message to the far end; if the ICFE is an SC AS, it sends a reINVITE message. Compared with Example Three, the message does not carry the media resource information of the destination MSC, and the message reaches the UE-2 via the CSCF;

In step 512, the UE-2 receives the update request, responds to the update request, for example by sending a "200 OK" message carrying the media resource information of the UE-2, and the message reaches the ICFE via the CSCF.

In step 513, in the mean time of step 511, the ICFE responds to the transfer request, for example by sending a "200 OK" message, and the transfer response finally reaches the MSC. If the transfer request transmitted in step 510 is an IAM message, the transfer response message will be converted into an ANM (answer message) by other gateway devices before reaching the MSC.

In step 514, after step 512, the ICFE receives an update response message, and finds out the terminal subscriber identifier of the UE-1 according to the handover terminal subscriber association information, and sends a connection establishment message to the UE-1 through the PS domain using the terminal identifier, for example by sending an INVITE message, carrying the media resource information of the UE-2 obtained in step 512. Different from Example Three, the ICFE does not request that the connection establishment message passes the destination MSC;

if the UE-1 has not finished the operation of accessing the destination network at this moment, the forwarded connection establishment message may be rejected. The operation of forwarding the connection establishment message is performed again after the destination ICFE receives a message for rejecting the forwarded connection establishment message or no response message of the connection establishment message is received when time is out, until the connection establishment message is accepted.

In step 515, the UE-1 receives the connection establishment message, and responds to the connection establishment message, for example by sending a "200 OK" message, which carries the media resource information of the UE-1. The connection establishment message reaches the ICFE.

In step 516, after receiving a connection establishment response message, the ICFE sends an update acknowledgement message, for example an ACK message, to the UE-2, wherein the message carries the media resource information obtained in step 515 and finally reaches UE-2 via the CSCF;

by now, IMS media connection 1 is established between the UE-1 and UE-2 such that the UE-1 can continue to talk with the UE-2.

In this example, if the original MSC and the destination MSC are the same MSC, in step 501, the destination MSC will also be in the signaling path of the original session, and there is no step 504 or 506, and if a REFER message is used as the transfer request in step 510, the message may be a REFER message transmitted along the original session path.

EXAMPLE FIVE

Figure 6:
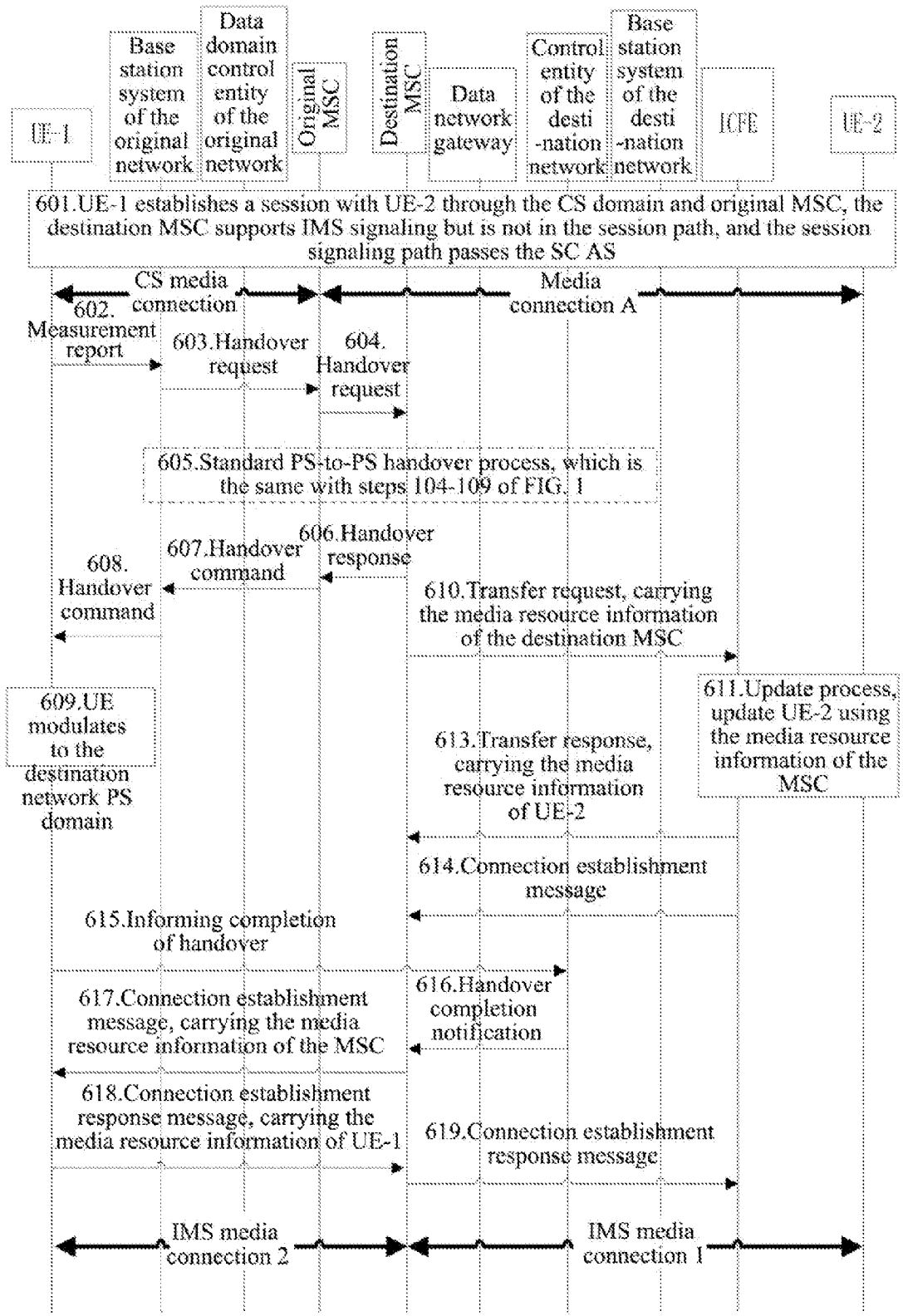
FIG. 6 is a flowchart of Example Five of the method for implementing rSRVCC according to the present invention.

FIG. 6 is a flowchart of Example Five of the method for implementing rSRVCC according to the present invention, which describes that a call is established between UE-1 and UE-2, and UE-1 establishes the call through CS domain access, so what is connected with UE-1 in the call media path is a segment of CS media connection, and when UE-1 moves and it needs to change the access mode of the UE-1 to the PS domain of LTE or HSPA, a media connection is established for the subsequent call through the media anchor of the destination MSC, and the destination MSC is not the original MSC, the process of the UE-1 implementing rSRVCC comprises the following steps:

steps 601-613 are the same with steps 301-313 in FIG. 3;

in step 614, after step 610, the ICFE finds out the terminal subscriber identifier of the UE-1 according to the handover terminal subscriber association information, and sends a connection establishment message to the UE-1 through the PS domain using the terminal identifier; for example, an INVITE is transmitted, the ICFE requests that the connection establishment message passes the destination MSC, for example routing information, which includes identifier information of the destination MSC, is configured in the header field of the call message, and if the identifier information cannot be used as transfer request association, the ICFE also carries the transfer request association information obtained in step 610 in the connection establishment message; after the message reaches the destination MSC, the destination MSC associates the transfer request in step 610 according to the transfer request association information but does not forward the message immediately;

in step 615, the UE-1 hands over to the destination network, and sends a message for informing handover completion, for example, an Attach Request (attachment request)

carrying an indication of handing over from the CS domain or a Tracking Area Update message, or a Service Request message carrying a handover instruction, or the like, to the destination network control entity, in step 616, the destination network control entity sends a handover completion notification message, for example, a PS to CS Handover Complete Notification, to the destination MSC, and the destination network control entity can determine the destination MSC according to the information of the destination cell which the UE-1 accesses;

in step 617, after receiving the handover completion notification message from the destination network control entity, the destination MSC forwards the connection establishment message of step 614 to the UE-1, and the forwarded connection establishment message carries the media resource information of the destination MSC;

steps 618-619 are the same with steps 316-317 in FIG. 3.

By now, IMS media connection 2 is established between the UE-1 and the destination MSC, IMS media connection 1 is established between the destination MSC and UE-2, the MSC connects the newly established IMS media connection 2 with the newly established IMS media connection 1 so that the UE-1 can continue to talk with the UE-2.

In this example, step 615 is the UE informing the control network element of the destination network that the CS-to-PS handover is completed, while in practical implementation, the MSC may inform the control network element of the destination network of occurrence of CS-to-PS handover after step 604, in which way the control network element of the destination network can execute step 616 after sensing that the UE accesses the destination network.

In this example, if the original MSC and the destination MSC are the same MSC, in step 601, the destination MSC will also be in the signaling path of the original session, and there is no step 604 or 606.

EXAMPLE SIX

Figure 7:
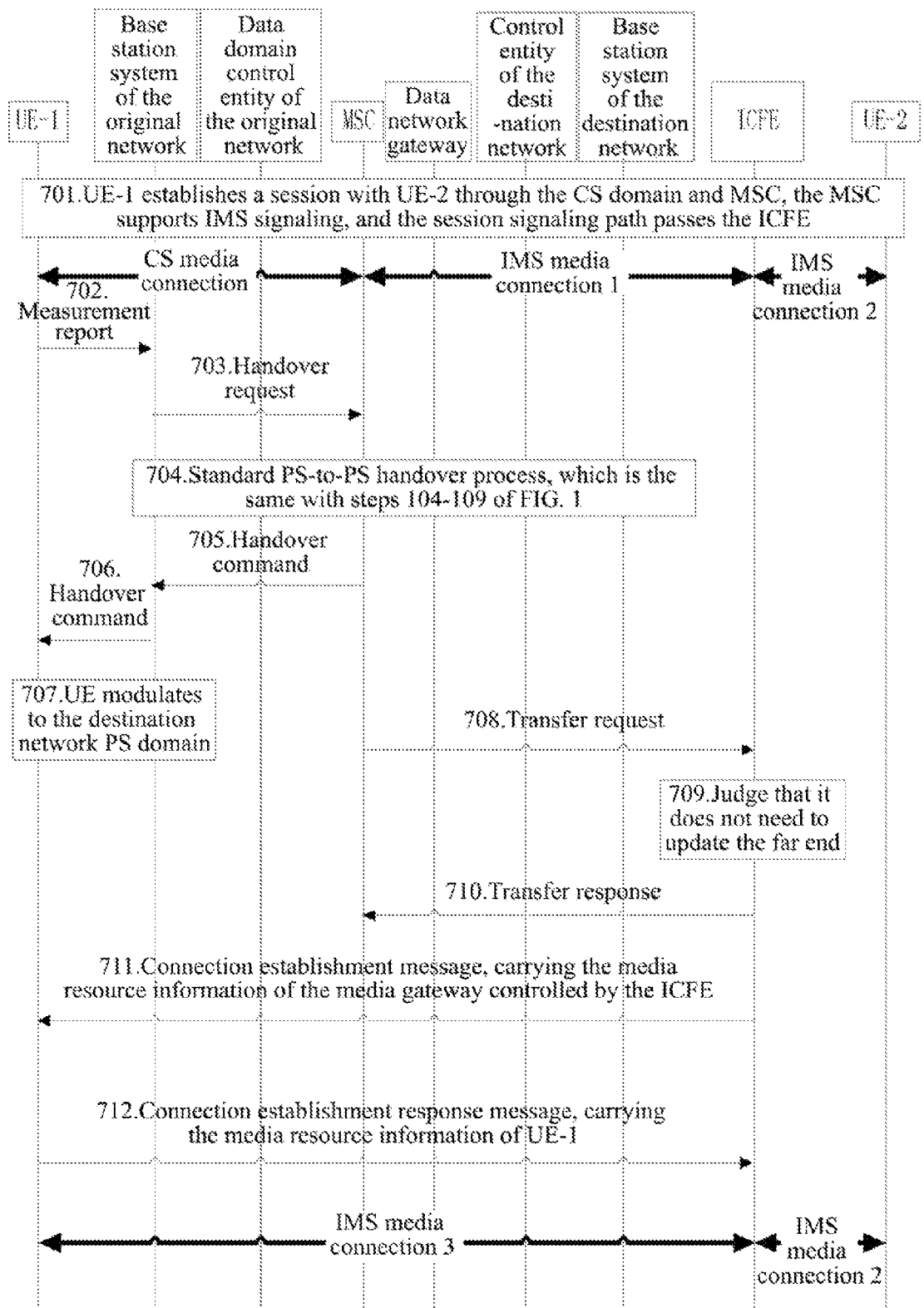
FIG. 7 is a flowchart of Example Six of the method for implementing rSRVCC according to the present invention.

FIG. 7 is a flowchart of Example Six of the method for implementing rSRVCC according to the present invention, which describes that a call is established between UE-1 and UE-2, and UE-1 establishes the call through the CS domain of a 2/3G network, so what is connected with UE-1 in the call media path is a segment of CS media connection, and the session signaling passes the ICFE, which controls the media gateway to anchor media connection; when UE-1 moves and it needs to change the access mode of the UE-1 to the PS domain of LTE or HSPA, a media connection is established for the subsequent call through the media gateway controlled by the ICFE, the process of the UE-1 implementing rSRVCC comprises the following steps:

steps 701-707 are the same with steps 201-207 in FIG. 2, except that the ICFE anchors media by controlling the media gateway so that the media connection between the MSC and UE-2 passes the media gateway controlled by the ICFE;

in step 708, after step 703, the destination MSC receives the handover request from the CS domain, and initiates a transfer request to the ICFE, or if the ICFE is not an SC AS, initiates a transfer request to the SC AS and requests that the transfer request passes by the ICFE (for example adding the identifier of the ICFE to the Route header field of the transfer request) (the identifier of the ICFE may be pre-configured in the MSC);

the transfer request may have various implementation modes, for example, an INVITE (invite) message or REFER (reference) message or IAM (initial address message) is initiated with the number of the SC AS or ICFE being the target, or an INVITE message or REFER message is initiated with the identifier of the SC AS or ICFE being the target.

The transfer request carries handover terminal subscriber association information, the handover terminal subscriber association information may be the subscriber identifier information or number information of the UE-1, and can be deduced from the International Mobile Subscriber Identity (IMSI) in the received handover request, and the ICFE can determine the corresponding terminal according to the handover terminal subscriber association information.

The number and/or identifier of the ICFE may be pre-configured in the MSC.

In step 709, the ICFE receives the transfer request, and since the media gateway controlled by the ICFE has anchored media, it is judged that it does not need to update the far end, and then the far end is not updated;

in step 710, after step 708, the ICFE responds to the transfer request, for example by sending a "200 OK" message, and the transfer response finally reaches the MSC. If the transfer request transmitted in step 708 is an IAM message, the transfer response message will be converted into an ANM (answer message) by other gateway devices before reaching the MSC;

in step 711, after step 708, the ICFE finds out the terminal subscriber identifier of the UE-1 according to the handover terminal subscriber association information, and sends a connection establishment message to the UE-1 through the PS domain using the terminal identifier, for example by sending an INVITE message, carrying the media resource information of the media gateway controlled by the ICFE, and the ICFE does not request that the connection establishment message passes the destination MSC;

if the UE-1 has not finished the operation of accessing the destination network at this moment, the forwarded connection establishment message may be rejected. The operation of forwarding the connection establishment message is performed again after the destination ICFE receives a message for rejecting the forwarded connection establishment message or no response message of the connection establishment message is received when time is out, until the connection establishment message is accepted.

In step 712, the UE-1 receives the connection establishment message, and responds to the connection establishment message, for example by sending a "200 OK" message, which carries the media resource information of the UE-1. The connection establishment response message reaches the ICFE.

By now, IMS media connection 3 is established between the UE-1 and the media gateway controlled by the ICFE, the IMS media connection 2 between the media gateway controlled by the ICFE and the UE-2 is reused, and the UE-1 is enabled to continue to talk with the UE-2 through data forwarding of the media gateway controlled by the ICFE.

EXAMPLE SEVEN

Figure 8:
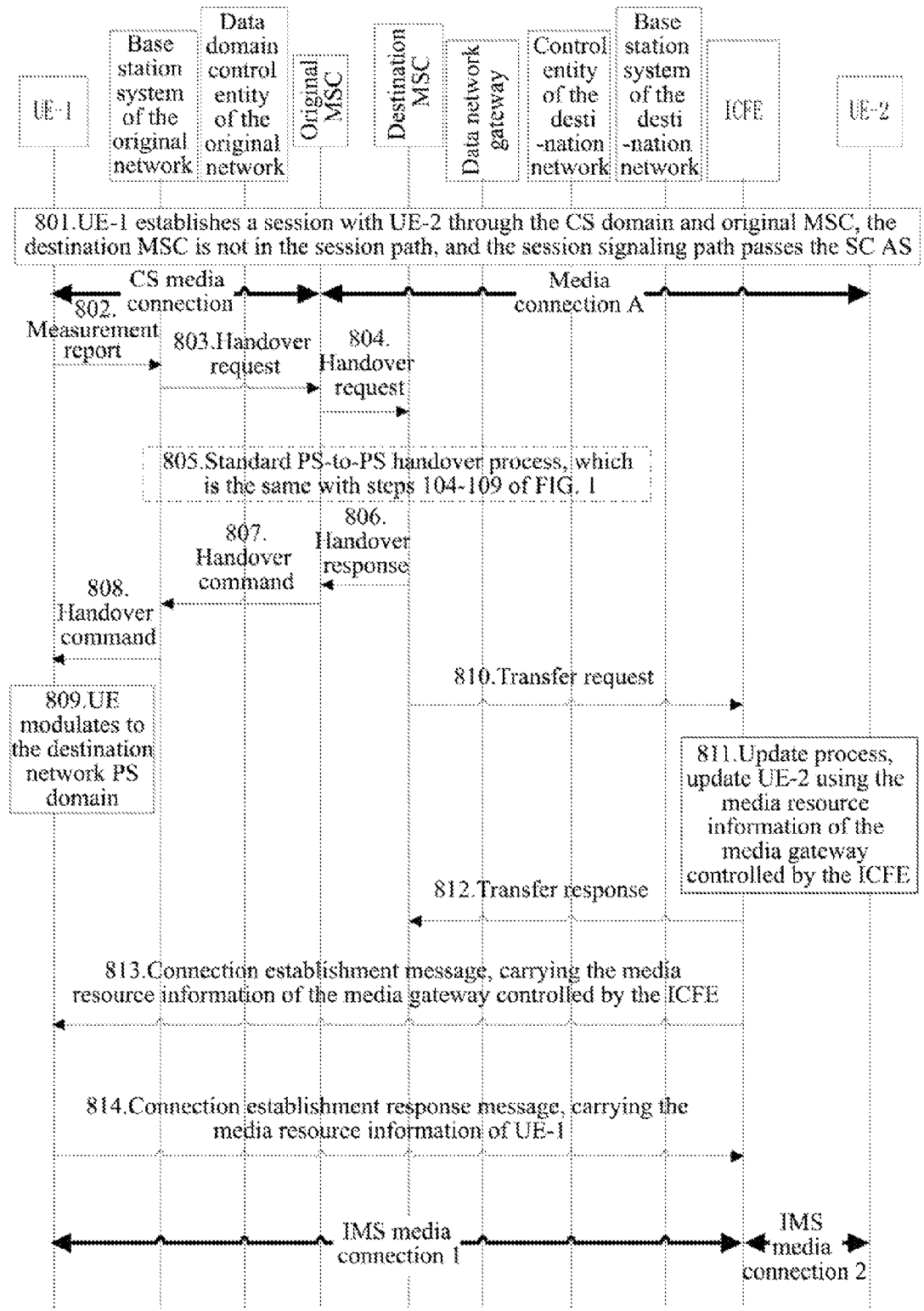
FIG. 8 is a flowchart of Example Seven of the method for implementing rSRVCC according to the present invention.

FIG. 8 is a flowchart of Example Seven of the method for implementing rSRVCC according to the present invention, which describes that a call is established between UE-1 and UE-2, and UE-1 establishes the call through the CS domain access, so what is connected with UE-1 in the call media path is a segment of CS media connection, and when UE-1 moves and it needs to change the access mode of the UE-1 to the PS domain of LTE or HSPA, the destination MSC is not in the signaling path of the subsequent session, and the destination MSC is not the original MSC, the process of the UE-1 implementing rSRVCC by directly interacting with the ICFE comprises the following steps:

steps 801-809 are the same with steps 501-509 in FIG. 5;

in step 810, after step 804, the destination MSC receives the handover request from the CS domain, and initiates a transfer request to the ICFE, or if the ICFE is not an SC AS, initiates a transfer request to the SC AS and requests that the transfer request passes by the ICFE (for example adding the identifier of the ICFE to the Route header field of the transfer request) (the identifier of the ICFE may be pre-configured in the MSC);

the transfer request may have various implementation modes, for example, an INVITE (invite) message or REFER (reference) message or IAM (initial address message) is initiated with the number of the SC AS or ICFE being the target, or an INVITE message or REFER message is initiated with the identifier of the SC AS or ICFE being the target.

The transfer request carries handover terminal subscriber association information, the handover terminal subscriber association information may be the subscriber identifier information or number information of the UE-1, and can be deduced from the International Mobile Subscriber Identity (IMSI) in the received handover request, and the ICFE can determine the corresponding terminal according to the handover terminal subscriber association information.

In step 811, after receiving the transfer request, the ICFE judges that it needs to initiate a flow of updating the far end, and sends an update request to the UE-2, for example if the ICFE is a P-CSCF or IBCF, it sends a transfer request, for example an INVITE message, to the SC AS (the identifier of the SC AS may be pre-configured in the ICFE), and then the SC AS sends a reINVITE message to the far end; if the ICFE is an SC AS, it sends a reINVITE message, the update request carries the media resource information of the media gateway controlled by the ICFE and reaches the UE-2 via the CSCF.

The UE-2 receives the update request, responds to the update request, for example by sending a "200 OK" message carrying the media resource information of the UE-2, and the message reaches the ICFE via the CSCF.

Steps 813-814 are the same with steps 711-712 in FIG. 7.

By now, IMS media connection 3 is established between the UE-1 and the media gateway controlled by the ICFE, the IMS media connection 2 between the media gateway controlled by the ICFE and the UE-2 is reused, and the UE-1 is enabled to continue to tack with the UE-2 through data forwarding of the media gateway controlled by the ICFE.

Another method for implementing rSRVCC provided in the present invention comprises the following steps:

after receiving a handover request from a Circuit Switch (CS) domain, a current Mobile Switch Center (MSC) sending a first transfer request to a Control Function Entity (ICFE) of an IP Multimedia Core Network Subsystem (IMS);

after accessing a destination network, a terminal sending a second transfer request, the second transfer request targeting the ICFE or passing the ICFE; and, after receiving the second transfer request, the ICFE sending a transfer response to the terminal.

See the following Examples Eight to Ten for detailed flows.

For media anchoring the media gateway controlled by the ICFE, see the following Examples Eight and Ten; for media not anchoring the media gateway controlled by the ICFE, see the following Example Nine.

Preferably, in the transfer request step, the ICFE updates the far end using the media resource information of the media gateway controlled by the ICFE after receiving the first transfer request; in the connection establishment step, after receiving the second transfer request, the ICFE sends the media resource information of the media gateway controlled by the ICFE to the terminal through a transfer response.

Preferably, in the transfer request step, after receiving the first transfer request, the ICFE requests the far end to transmit media resource information; in the connection establishment step, the second transfer request carries the media resource information of the terminal, the ICFE, after receiving the second transfer request and the message carrying the media resource information sent by the far end, sends the media resource information in the message sent by the far end to the terminal through a transfer response, and sends the media resource information in the second transfer request to the far end.

EXAMPLE EIGHT

Figure 9:
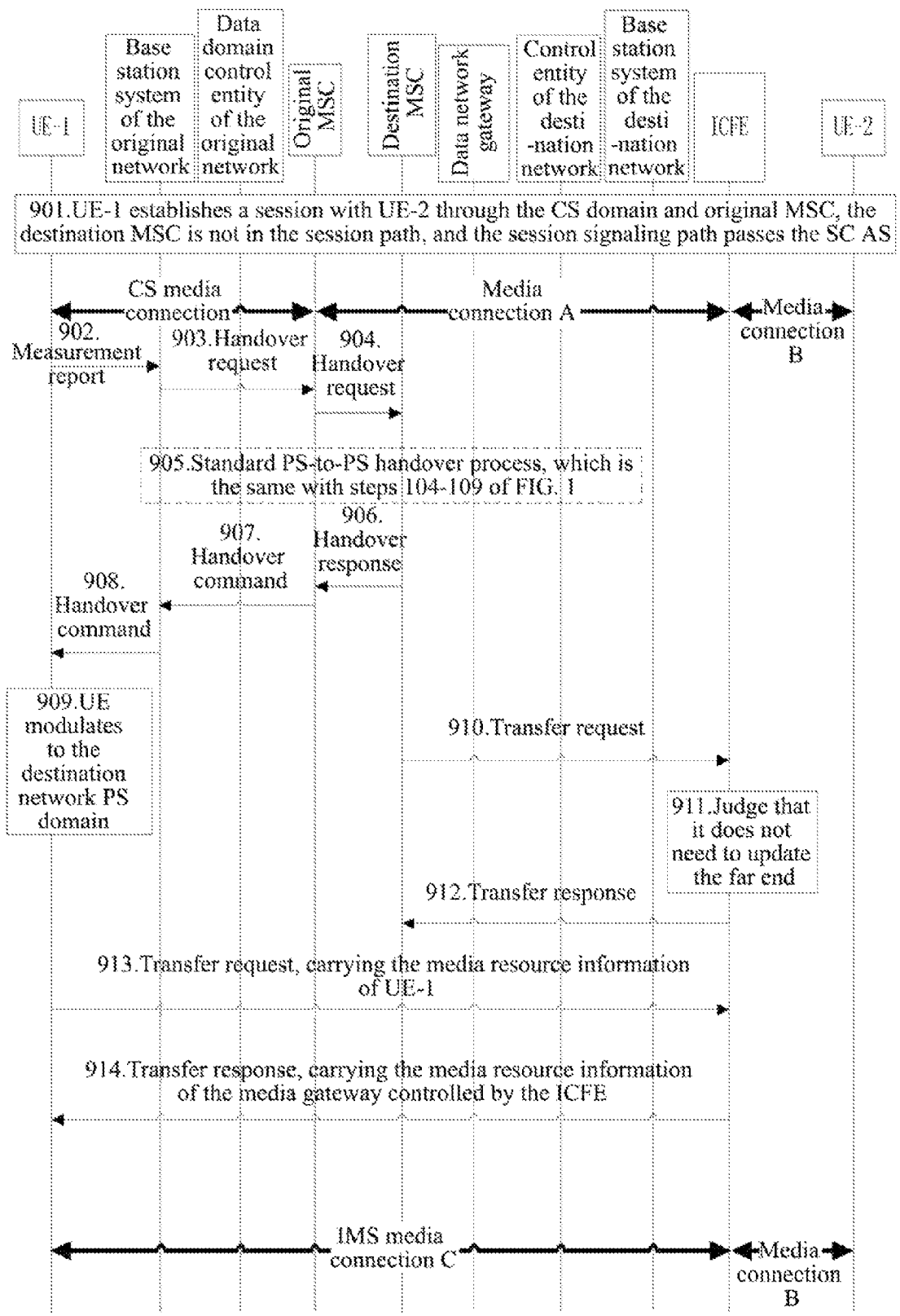
FIG. 9 is a flowchart of Example Eight of the method for implementing rSRVCC according to the present invention.

FIG. 9 is a flowchart of Example Eight of the method for implementing rSRVCC according to the present invention, which describes that a call is established between UE-1 and UE-2, and UE-1 establishes the call through CS domain access, so what is connected with UE-1 in the call media path is a segment of CS media connection, and the session signaling passes the ICFE, which controls the media gateway to anchor media connection. When UE-1 moves and it needs to change the access mode of the UE-1 to the PS domain of LTE or HSPA, the destination MSC is not in the signaling path of the subsequent session, and the destination MSC is not the original MSC, the process of the UE-1 implementing rSRVCC comprises the following steps:

steps 901-910 are the same with steps 501-510 in FIG. 5, except that the ICFE anchors media by controlling the media gateway so that the media connection between the MSC and UE-2 passes the media gateway controlled by the ICFE;

in step 911, the ICFE receives the transfer request, and since the media gateway controlled by the ICFE has anchored media, it is judged that it does not need to update the far end, and the far end is not updated;

in step 912, after step 910, the ICFE responds to the transfer request, for example by sending a "200 OK" message, and the transfer response finally reaches the MSC. If the transfer request transmitted in step 910 is an IAM message, the transfer response message will be converted into an ANM (answer message) by other gateway devices before reaching the MSC;

in step 913, the UE-1 initiates a transfer request in the PS domain of the destination network, for example, sending an INVITE message using the identifier of the SC AS or ICFE as the target (if the SC AS is taken as the target, the message must passes the ICFE, which may be implemented by adding the ICFE into the service routing during registration), and the message may carry the media resource information of the UE-1 and reaches the ICFE;

in step 914, the ICFE receives the transfer request sent by the UE-1, and responds to the transfer request, for example by sending a "200 OK" message carrying the media resource information of the media gateway controlled by the ICFE;

if the INVITE message in step 913 does not carry the media resource information of the UE-1, the UE-1 sends an ACK (acknowledgement) message, which carries the media resource information of the UE-1, after receiving the response message.

By now, IMS media connection C is established between the UE-1 and the media gateway controlled by the ICFE, the IMS media connection B between the media gateway controlled by the ICFE and the UE-2 is reused, and the UE-1 is enabled to continue to tack with the UE-2 through data forwarding of the media gateway controlled by the ICFE.

EXAMPLE NINE

Figure 10:
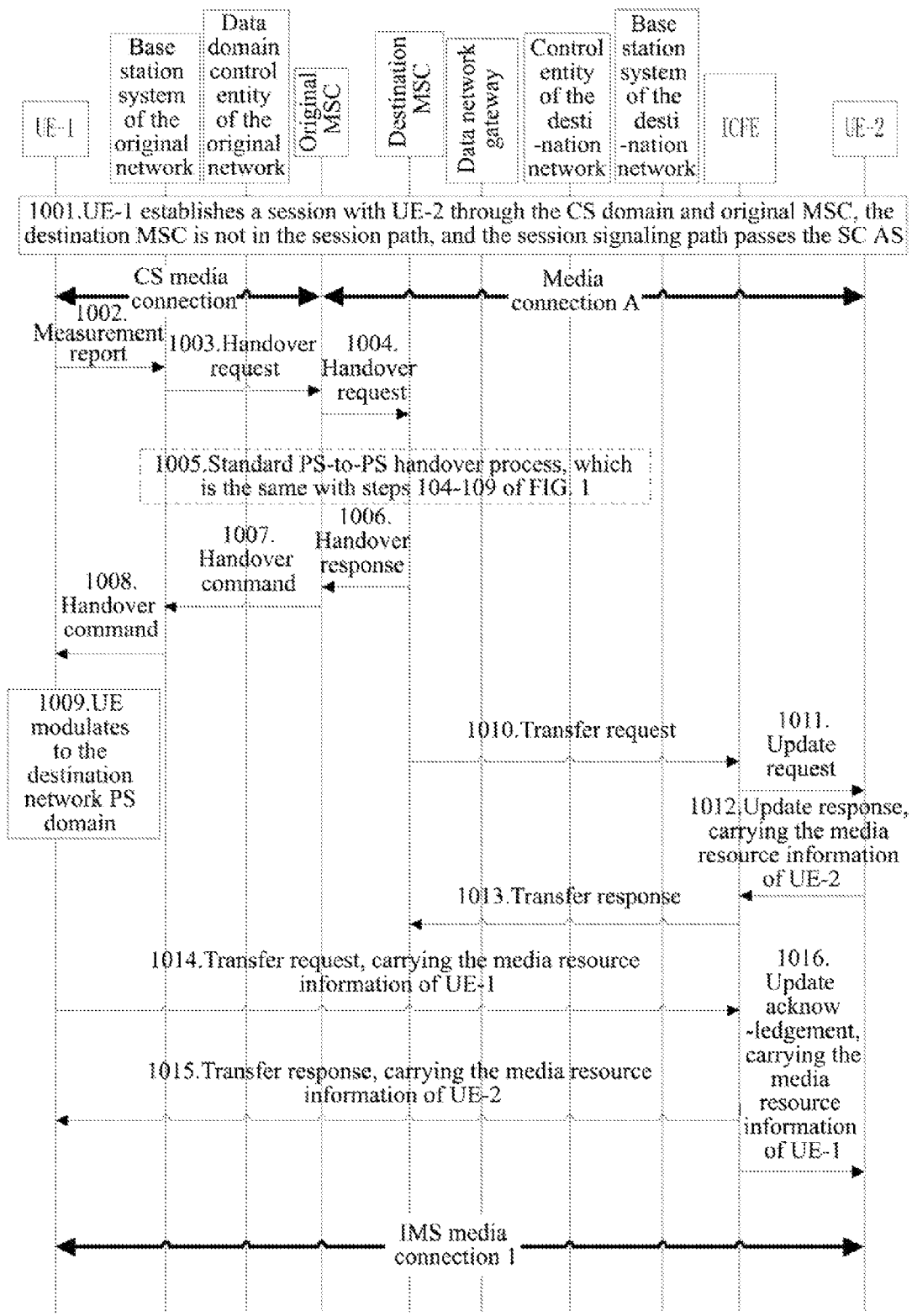
FIG. 10 is a flowchart of Example Nine of the method for implementing rSRVCC according to the present invention.

FIG. 10 is a flowchart of Example Nine of the method for implementing rSRVCC according to the present invention, which describes that a call is established between UE-1 and UE-2, and UE-1 establishes the call through CS domain access, so what is connected with UE-1 in the call media path is a segment of CS media connection; when UE-1 moves and it needs to change the access mode of the UE-1 to the PS domain of LTE or HSPA, the destination MSC is not in the signaling path of the subsequent session, and the destination MSC is not the original MSC, the process of the UE-1 implementing rSRVCC comprises the following steps:

steps 1001-1013 are the same with steps 501-513 in FIG. 5;

in step 1014, the UE-1 initiates a transfer request in the PS domain of the destination network, for example, sending an INVITE message using the identifier of the SC AS or ICFE as the target (if the SC AS is taken as the target, the message must passes the ICFE, which may be implemented by adding the ICFE into the service routing during registration), and the message reaches the ICFE;

in step 1015, the ICFE receives the transfer request sent by the UE-1, and responds to the transfer request, for example by sending a "200 OK" message carrying the media resource information of the UE-2 obtained in step 1012;

in step 1016, the ICFE sends an update acknowledgement message, for example an ACK message, to the UE-2, wherein the message carries the media resource information of the UE-1 obtained in step 1014;

by now, IMS media connection 1 is established between the UE-1 and UE-2 such that the UE-1 can continue to talk with the UE-2.

In this example, if the original MSC and the destination MSC are the same MSC, in step 1001, the destination MSC will also be in the signaling path of the original session, and there is no step 1004 or 1006, and if the a REFER message is used as the transfer request in step 1010, the message may be a REFER message transmitted along the original session path.

EXAMPLE TEN

Figure 11:
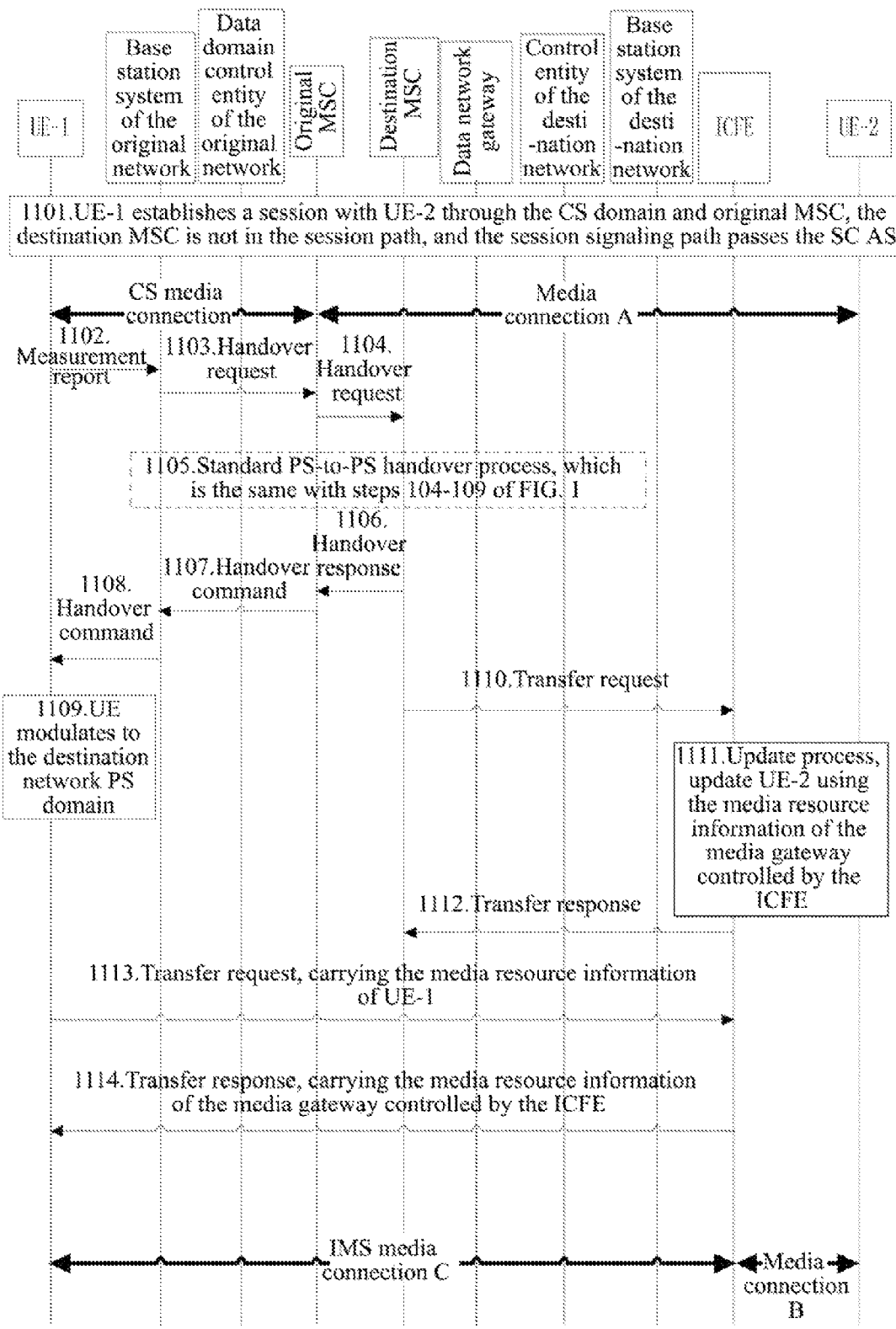
FIG. 11 is a flowchart of Example Ten of the method for implementing rSRVCC according to the present invention.

FIG. 11 is a flowchart of Example Ten of the method for implementing rSRVCC according to the present invention, which describes that a call is established between UE-1 and UE-2, and UE-1 establishes the call through CS domain access, so what is connected with UE-1 in the call media path is a segment of CS media connection; when UE-1 moves and it needs to change the access mode of the UE-1 to the PS domain of LTE or HSPA, the destination MSC is not in the signaling path of the subsequent session, and the destination MSC is not the original MSC, the process of the UE-1 implementing rSRVCC comprises the following steps:

steps 1101-1110 are the same with steps 501-510 in FIG. 5;

in step 1111, after receiving the transfer request, the ICFE judges that it needs to initiate a flow of updating the far end, and sends an update request to the UE-2, for example if the ICFE is a P-CSCF or IBCF, it sends a transfer request, for example an INVITE message, to the SC AS (the identifier of the SC AS may be pre-configured in the ICFE), and then the SC AS sends a reINVITE message to the far end; if the ICFE is an SC AS, it sends a reINVITE message, the update request carries the media resource information of the media gateway controlled by the ICFE, and reaches the UE-2 via the CSCF;

the UE-2 receives the update request, responds to the update request, for example by sending a "200 OK" message carrying the media resource information of the UE-2, and the message reaches the ICFE via the CSCF;

steps 1112-1114 are the same with steps 912-914 in FIG. 9;

by now, IMS media connection C is established between the UE-1 and the media gateway controlled by the ICFE, the IMS media connection B between the media gateway controlled by the ICFE and the UE-2 is reused, and the UE-1 is enabled to continue to talk with the UE-2 through data forwarding of the media gateway controlled by the ICFE.

In order to implement the above method, the present invention further provides a system for implementing rSRVCC, comprising a mobile switch center (MSC) and an IMS control function entity (ICFE), wherein:

the MSC comprises a transfer request module, and when the MSC is a current MSC, the transfer request module is configured to send to the ICFE a transfer request regarding a terminal subscriber or a session in which the terminal subscriber participates;

the ICFE comprises a connection establishment control module, which is configured to receive the transfer request, and initiate a media connection establishment flow between the terminal and the far end after receiving the transfer request.

As for Examples One, Two, Three and Five, the connection establishment control module of the ICFE initiates a media connection establishment flow between the terminal and the far end by way of sending a connection establishment message to the terminal through the current MSC.

As for Examples One, Two and Five, the transfer request carries transfer request association information, the MSC further comprises a connection establishment message forwarding module connected with the transfer request module and a media connection establishing module, the connection establishment message forwarding module is configured to receive a connection establishment message sent by the ICFE and forward it to the terminal; the forwarded connection establishment message carries media resource information associating the current MSC; the media connection establishing module is configured to establish a media connection with the terminal after receiving the message of the terminal carrying the media resource information; and, associate the media connection between the current MSC and the terminal with the media connection between the current MSC and the far end according to the transfer request association information.

As for Examples One, Two and Five, the transfer request sent by the current MSC carries the media resource information of the current MSC; the connection establishment control module of the ICFE is further configured to use the media resource information carried in the transfer request to directly update the far end, or firstly judges whether it needs to update the far end, and updates the far end if so.

As for Example Three, the connection establishment control module of the ICFE is further configured to request the far end to transmit media resource information after receiving the transfer request, and after receiving the message of the far end carrying the media resource information, send out the media resource information in the message through the connection establishment message.

As for Examples One to Three, the connection establishment message forwarding module of the current MSC is further configured to forward the connection establishment message again after receiving a message sent by the terminal for rejecting the connection establishment message, or no response message of the connection establishment message is received when time is out.

As for Example Five, the connection establishment message forwarding module of the current MSC is further configured to forward the connection establishment message to the terminal after receiving a handover completion notification sent by the destination network control entity.

Preferably, the system further comprises a destination network control entity; the transfer request module of the MSC is further configured to send a handover notification to the destination network control entity after receiving a handover request from the CS domain; the destination network control entity is configured to receive the handover notification, and send a handover completion notification to the current MSC after sensing that the terminal accesses the destination network or after receiving a handover completion indication sent by the terminal.

As for Examples Four, Six and Seven, the connection establishment control module of the ICFE, after receiving the transfer request, initiates a media connection establishment flow between the terminal and the far end by way of sending a connection establishment message to the terminal.

As for Example Four, the connection establishment control module of the ICFE is further configured to request the far end to transmit media resource information after receiving the transfer request, and after receiving the message of the far end carrying the media resource information, send out the media resource information in the message through a connection establishment message.

As for Example Six, the connection establishment control module of the ICFE is further configured to send out the media resource information of the media gateway controlled by the ICFE through the connection establishment message after receiving the transfer request.

As for Example Seven, the connection establishment control module of the ICFE is further configured to update the far end using the media resource information of the media gateway controlled by the ICFE after receiving the transfer request.

As for Examples Four, Six and Seven, the connection establishment control module of the ICFE is further configured to forward the connection establishment message again after receiving a message sent by the terminal for rejecting the connection establishment message, or no response message of the connection establishment message is received when time is out.

As for Examples Eight, Nine and Ten, the present invention further provides another system for implementing reverse Single Radio Voice Call Continuity (rSRVCC), comprising a Mobile Switch Center (MSC), a terminal and an IP Multimedia Core Network Subsystem (IMS) Control Function Entity (ICFE), wherein:

the MSC is configured to, when the MSC is a current MSC, send a first transfer request to the ICFE after receiving a handover request from a Circuit Switch (CS) domain;

the terminal is configured to, after accessing a destination network, send a second transfer request; the second transfer request targets the ICFE or passes the ICFE;

the ICFE is configured to send a transfer response to the terminal after receiving the second transfer request; and as for example Nine, the second the second transfer request carries the media resource information of the terminal, and the ICFE is further configured to, after receiving the first transfer request, request the far end to transmit media resource information; and, after receiving the second transfer request and the message carrying the media resource information sent by the far end, send the media resource information in the message sent by the far end to the terminal through the transfer response, and send the media resource information in the second transfer request to the far end.

As for example Ten, the ICFE is further configured to update the far end using the media resource information of the media gateway controlled by the ICFE after receiving the first transfer request; and after receiving the second transfer request, send the media resource information of the media gateway controlled by the ICFE to the terminal through a transfer response.

A person having ordinary skill in the art can appreciate that all of part of the steps of the above method may be implemented by instructing related hardware with a program, which may be stored in a computer-readable medium, such as a read-only memory, a magnetic disk or an optical disk. Optionally, all of part of the steps of the above examples may also be implemented by using one or more integrated circuits. Correspondingly, each module/unit in the above examples may be implemented in the form of hardware, or in the form of software functional modules. The present invention is not limited to any particular form of combination of hardware and software.

Of course, the present invention may have many other examples, and a person having ordinary skill in the art can make various corresponding modifications and transformations to the present invention without departing from the spirit and essence of the present invention. However, these corresponding modifications and transformations shall all fall into the protection scope of the attached claims of the present invention.

INDUSTRIAL APPLICABILITY

By using the method and system for implementing rSRVCC provided in the present invention, with the aid of the current MSC of the network, the media connection establishment flow between the terminal and the far end is initiated by the IMS control function entity (ICFE) or by the terminal such that the reverse Single Radio Voice Call Continuity is ensured when the terminal hands over from the CS domain to the PS domain.

What is claimed is:

1. A method for implementing reverse Single Radio Voice Call Continuity (rSRVCC), comprising the following steps of:

upon receiving a handover request for a terminal from a Circuit Switch (CS) domain, sending by a current Mobile Switch Center (MSC) a transfer request regarding the terminal or a session in which the terminal participates to an IP Multimedia Core Network Subsystem Control Function Entity (ICFE); and after receiving the transfer request, initiating by the ICFE a media connection establishment flow between the terminal and a far end;

wherein, when signaling anchors the current MSC, the step of initiating by the ICFE a media connection establishment flow between the terminal and the far end after receiving the transfer request comprises:

sending by the ICFE a connection establishment message to the terminal through the current MSC after receiving the transfer request;

wherein, when media anchors the current MSC, the transfer request carries transfer request association information; and, the media connection establishment flow comprises:
sending by the ICFE to the terminal the connection establishment message through the MSC, wherein the connection establishment message carries the transfer request association information, and the connection establishment message forwarded by the current MSC to the terminal carries media resource information of the current MSC;
establishing by the current MSC a media connection with the terminal after receiving a message carrying media resource information from the terminal; and
associating by the current MSC the media connection between the current MSC and the terminal with the media connection between the current MSC and the far end according to the transfer request association information.

2. The method according to claim 1, wherein, when media anchors the current MSC,
the transfer request sent by the current MSC carries the media resource information of the current MSC; and,
the method further comprises: after receiving the transfer request, using by the ICFE the media resource information carried in the transfer request to directly update the far end, or firstly judging whether the far end needs to be updated, and updating the far end if the far end needs to be updated.

3. The method according to claim 1, wherein, the step of initiating by the ICFE a media connection establishment flow between the terminal and a far end after receiving the transfer request further comprises: requesting by the ICFE the far end to transmit media resource information after receiving the transfer request, and after receiving a message carrying the media resource information from the far end, sending out the media resource information in the message through the connection establishment message.

4. The method according to claim 1, wherein, the step of initiating by the ICFE a media connection establishment flow between the terminal and a far end after receiving the transfer request further comprises: forwarding by the current MSC the connection establishment message again after receiving a message sent by the terminal for rejecting the connection establishment message, or if no response message of the connection establishment message is received within a time period.

5. The method according to claim 1, wherein, the connection establishment message is forwarded by the current MSC to the terminal after receiving a handover completion notification sent by a destination network control entity.

6. The method according to claim 5, wherein, the handover completion notification is transmitted by the destination network control entity in any one of the following cases:
after receiving a handover request from the CS domain, sending by the current MSC a handover notification to the destination network control entity, and sending by the destination network control entity the handover completion notification to the current MSC after sensing that the terminal accesses the destination network; or,
after completing handover, sending by the terminal a handover completion indication to the destination network control entity, and sending by the destination network control entity the handover completion notification to the current MSC after receiving the indication.

7. The method according to claim 1, wherein, the step of initiating by the ICFE a media connection establishment flow between the terminal and a far end after receiving the transfer request comprises:

sending by the ICFE a connection establishment message to the terminal after receiving the transfer request.

8. The method according to claim 7, wherein, the step of initiating by the ICFE a media connection establishment flow between the terminal and a far end after receiving the transfer request further comprises: sending out by the ICFE the media resource information of the media gateway controlled by the ICFE through the connection establishment message after receiving the transfer request.

9. The method according to claim 8, wherein, the step of initiating by the ICFE a media connection establishment flow between the terminal and a far end after receiving the transfer request further comprises: updating by the ICFE the far end using the media resource information of the media gateway controlled by the ICFE after receiving the transfer request.

10. The method according to claim 7, wherein, the step of initiating by the ICFE a media connection establishment flow between the terminal and a far end after receiving the transfer request further comprises: requesting by the ICFE the far end to transmit media resource information after receiving the transfer request, and after receiving a message carrying the media resource information from the far end, sending out by the ICFE the media resource information in the message through the connection establishment message.

11. The method according to claim 7, the step of initiating by the ICFE a media connection establishment flow between the terminal and a far end after receiving the transfer request further comprises: forwarding by the ICFE the connection establishment message again after receiving a message sent by the terminal for rejecting the connection establishment message, or if no response message of the connection establishment message is received within a time period.

12. A method for implementing reverse Single Radio Voice Call Continuity (rSRVCC), comprising the following steps of:
upon receiving by a current Mobile Switch Center (MSC) a handover request for a terminal from a Circuit Switch (CS) domain, a handover command being immediately sent to the CS domain to reach a base station system of the CS domain and sending by the current MSC a first transfer request regarding the terminal or a session in which the terminal participates to an IP Multimedia Core Network Subsystem Control Function Entity (ICFE), the first transfer request sent from the current MSC to the ICFE carrying handover terminal subscriber association information according to which the ICFE can determine the corresponding terminal;
after accessing a destination network, sending by the terminal a second transfer request, the second transfer request targeting the ICFE or passing the ICFE; and,
after receiving the second transfer request, sending by the ICFE a transfer response to the terminal.

13. The method according to claim 12, further comprising:
after receiving the first transfer request, requesting by the ICFE the far end to transmit media resource information; and,
the second transfer request carrying the media resource information of the terminal, and after receiving the second transfer request and a message carrying the media resource information sent by the far end, sending by the ICFE the media resource information in the message sent by the far end to the terminal through a transfer response, and sending the media resource information in the second transfer request to the far end.

14. The method according to claim 12, further comprising:
updating by the ICFE the far end using the media resource information of the media gateway controlled by the ICFE after receiving the first transfer request;
after receiving the second transfer request, sending by the ICFE the media resource information of the media gateway controlled by the ICFE to the terminal through a transfer response.

15. A system for implementing reverse Single Radio Voice Call Continuity (rSRVCC), comprising a Mobile Switch Center (MSC), a terminal and an IP Multimedia Core Network Subsystem Control Function Entity (ICFE), wherein:
the MSC comprises a processor which executes steps of: when the MSC is a current MSC, upon receiving a handover request for the terminal from a Circuit Switch (CS) domain, sending a first transfer request regarding the terminal or a session in which the terminal participates to the ICFE, wherein a handover command is immediately sent to the CS domain to reach a base station system of the CS domain upon the MSC receives the handover request for the terminal from the CS domain, and the first transfer request sent from the MSC to the ICFE carries handover terminal subscriber association information according to which the ICFE can determine the corresponding terminal;
the terminal comprises a processor which executes steps of: after accessing a destination network, sending a second transfer request; the second transfer request targeting the ICFE or passing the ICFE;
the ICFE comprises a processor which executes steps of: sending a transfer response to the terminal after receiving the second transfer request.

16. The system according to claim 15, wherein,
the second transfer request carries the media resource information of the terminal, and the processor of the ICFE further executes steps of: after receiving the first transfer request, requesting the far end to transmit media resource information; and, after receiving the second transfer request and a message carrying the media resource information sent by the far end, sending the media resource information in the message sent by the far end to the terminal through the transfer response, and sending the media resource information in the second transfer request to the far end.

17. The system according to claim 15, wherein,
the processor of the ICFE further executes steps of: updating the far end using the media resource information of the media gateway controlled by the ICFE after receiving the first transfer request; and after receiving the second transfer request, sending the media resource information of the media gateway controlled by the ICFE to the terminal through a transfer response.

* * * * *